United States Patent
Adachi

(10) Patent No.: US 11,137,846 B2
(45) Date of Patent: *Oct. 5, 2021

(54) DISPLAY DEVICE WITH TOUCH DETECTION FUNCTION AND ELECTRONIC APPARATUS

(71) Applicant: Japan Display Inc., Tokyo (JP)

(72) Inventor: Koichiro Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,107

(22) Filed: Nov. 7, 2019

(65) Prior Publication Data

US 2020/0073508 A1   Mar. 5, 2020

Related U.S. Application Data

(63) Continuation of application No. 15/397,361, filed on Jan. 3, 2017, now Pat. No. 10,509,506, which is a
(Continued)

(30) Foreign Application Priority Data

Dec. 28, 2012   (JP) ................................ 2012-288905

(51) Int. Cl.
   *G06F 3/041*  (2006.01)
   *G06F 3/044*  (2006.01)
   (Continued)

(52) U.S. Cl.
   CPC ........ *G06F 3/0412* (2013.01); *G02F 1/13338* (2013.01); *G02F 1/133512* (2013.01);
   (Continued)

(58) Field of Classification Search
   None
   See application file for complete search history.

(56) References Cited

U.S. PATENT DOCUMENTS 10,509,506 B2 *  12/2019  Adachi ............. G02F 1/134336
2004/0027340 A1   2/2004  Muraoka et al.
(Continued)

FOREIGN PATENT DOCUMENTS

CN   102750031    10/2012
JP   2004-070771   3/2004
(Continued)

OTHER PUBLICATIONS

Notice of Rejection issued in connection with Japanese Patent Application No. 2012-288905, dated Mar. 31, 2015. (7 pages).
(Continued)

*Primary Examiner* — Christopher R Lamb
(74) *Attorney, Agent, or Firm* — K&L Gates LLP

(57) ABSTRACT

According to an aspect, a display device with a touch detection function includes: a plurality of pixel electrodes arranged in a matrix; a plurality of scanning signal lines; a drive electrode that faces the pixel electrodes; and a plurality of touch detection electrodes including a detection electrode pattern of a transparent conductive body that faces the drive electrode. The detection electrode pattern includes one or more slits each of which is a region where the transparent conductive body is not present. The slits of the detection electrode pattern of the touch detection electrodes extend in a direction different from an extending direction of the scanning signal lines with a slit pitch having a predetermined interval therebetween in the extending direction of the scanning signal lines. The slit pitch is multiples of a natural number of a predetermined pixel pitch in which the pixel electrodes are arranged.

19 Claims, 33 Drawing Sheets

Related U.S. Application Data continuation of application No. 14/109,038, filed on Dec. 17, 2013, now abandoned.

(51) Int. Cl.
  *G02F 1/1333* (2006.01)
  *G02F 1/1335* (2006.01)
  *G02F 1/1343* (2006.01)

(52) U.S. Cl.
  CPC ...... *G02F 1/134336* (2013.01); *G06F 3/0445* (2019.05); *G06F 3/0446* (2019.05); *G06F 3/04184* (2019.05); *G02F 2201/123* (2013.01); *G06F 2203/04107* (2013.01); *G06F 2203/04108* (2013.01)

(56) References Cited

U.S. PATENT DOCUMENTS

| | | | |
|---|---|---|---|
| 2009/0213308 A1* | 8/2009 | Kadowaki | G02F 1/133512 349/106 |
| 2011/0102361 A1 | 5/2011 | Philipp | |
| 2012/0044202 A1 | 2/2012 | Ishizaki | |
| 2012/0268418 A1 | 10/2012 | Iskizaki | |
| 2012/0319974 A1* | 12/2012 | Kim | G06F 3/0445 345/173 |
| 2013/0016363 A1 | 1/2013 | Iwamoto | |
| 2013/0207924 A1 | 8/2013 | Mohindra | |

FOREIGN PATENT DOCUMENTS

| | | |
|---|---|---|
| JP | 2007-264393 | 10/2007 |
| JP | 2009-116433 | 5/2009 |
| JP | 2011-138154 | 7/2011 |
| JP | 2012-226687 | 11/2012 |
| TW | 200643778 | 12/2006 |
| TW | 201250545 | 12/2012 |

OTHER PUBLICATIONS

Taiwan Office Action dated Apr. 28, 2015 in corresponding Taiwan Application No. 102147295.

Chinese Office Action dated May 23, 2016 in corresponding Chinese Application No. 201310739415.6.

* cited by examiner

DISPLAY DEVICE WITH TOUCH DETECTION FUNCTION AND ELECTRONIC APPARATUS

CROSS REFERENCES TO RELATED APPLICATIONS

The present application is a continuation of U.S. patent application Ser. No. 15/397,361, filed on Jan. 3, 2017, which is a continuation of U.S. patent application Ser. No. 14/109,038, filed on Dec. 17, 2013, which application claims priority to Japanese Priority Patent Application JP 2012-288905 filed in the Japan Patent Office on Dec. 28, 2012, the entire content of which is hereby incorporated by reference.

BACKGROUND

1. Technical Field

The present disclosure relates to a display device and an electronic apparatus that can detect an external proximity object, and more particularly relates to a display device with a touch detection function and an electronic apparatus that can detect an external proximity object based on a change in capacitance.

2. Description of the Related Art

In recent years, a touch detection device that can detect an external proximity object, a so-called "touch panel", is drawing attention. The touch panel is used for the display device with a touch detection function in which a touch detection device is mounted on or integrated with a display device such as a liquid-crystal display device. The display device with a touch detection function displays various button images or the like on the display device, and thereby allows information to be input by the touch panel instead of a general mechanical button. The display device with a touch detection function having such a touch panel does not require an input device such as a keyboard, a mouse, or a keypad. Accordingly, the usage thereof is increasing in portable information devices such as mobile phone as well as computers.

As a method of touch detection, various methods such as an optical method, a resistive method, and a capacitive method can be mentioned. A capacitive type touch detection device has a relatively simple structure and can realize low power consumption. Accordingly, the capacitive type touch detection device can be that can be used for a mobile device. For example, Japanese Patent Application Laid-open Publication No. 2011-138154 describes a touch panel in which a transparent electrode pattern is made invisible. Japanese Patent Application Laid-open Publication No. 2007-264393 relates to a liquid crystal display device having a light-transmissive light condensing sheet, and describes a technique for suppressing a contrasting pattern (Moire) due to interference between a prism array pitch of the light condensing sheet and a pixel pitch of a liquid-crystal display panel.

Meanwhile, in the display device with a touch detection function, a pixel of a display panel and a touch detection electrode overlap each other. In the touch detection electrode, a transparent conducting oxide such as ITO (Indium Tin Oxide) is used as a material of the transparent electrode. The touch detection electrode is transparent, but has a predetermined refraction index. Therefore, in the display device with a touch detection function, a slit hole pattern is provided in a transparent electrode pattern of the touch detection electrode, so that the touch detection electrode is made invisible and less noticeable on human eyes.

There may be a difference in optical wavelengths between light that is emitted from the pixel of the display panel, passes through the transparent electrode pattern of the touch detection electrode, and reaches a human and light that is emitted from the pixel of the display panel, passes through the slit hole pattern, and reaches the human. The difference in optical wavelengths appears as a change in color to be displayed originally, and stripes (hereinafter, also referred to as "Moire fringes") of a color shift pattern (color Moire) may become visible according to a field angle at which the human watches the display panel.

For the foregoing reasons, there is a need for a display device and an electronic apparatus that can decrease Moire fringes due to a touch detection electrode.

SUMMARY

According to an aspect, a display device with a touch detection function includes: a substrate; a plurality of pixel electrodes arranged in a matrix on a plane parallel to a surface of the substrate; a plurality of scanning signal lines extending on a plane parallel to the surface of the substrate to supply a scanning signal for driving the pixel electrodes; a display functional layer that provides an image display function based on an image signal; a drive electrode that faces the pixel electrodes in a vertical direction to the surface of the substrate and extends in a direction parallel to an extending direction of the scanning signal lines; and a plurality of touch detection electrodes including a detection electrode pattern of a transparent conductive body that faces the drive electrode in the vertical direction and extends in a direction different from the extending direction of the scanning signal lines. The detection electrode pattern includes one or more slits each of which is a region where the transparent conductive body is not present. The slits of the detection electrode pattern of the touch detection electrodes extend in a direction different from the extending direction of the scanning signal lines with a slit pitch having a predetermined interval therebetween in the extending direction of the scanning signal lines. The slit pitch is multiples of a natural number of a predetermined pixel pitch in which the pixel electrodes are arranged.

According to another aspect, an electronic apparatus includes the display device with a touch detection function.

Additional features and advantages are described herein, and will be apparent from the following Detailed Description and the figures.

DETAILED DESCRIPTION

Embodiments for carrying out the present disclosure will be explained in detail with reference to the accompanying drawings. The present disclosure is not limited to the contents described in the following embodiments. Constituent elements described in the following explanations include those that can be easily conceived by persons skilled in the art and that are substantially identical. In addition, constituent elements described in the following explanations can be combined as appropriate. Explanations are made with the following order.
1. Embodiments (Display device with touch detection function)
 1-1. First embodiment
 1-2. Second embodiment
 1-3. Third embodiment
 1-4. Modifications
2. Application example (Electronic apparatus)
Example in which a display with a touch detection function device according to the above embodiments is applied to an electronic apparatus
3. Aspects of the present disclosure

1. EMBODIMENTS

1-1. First Embodiment

1-1A. Configuration Example

Overall Configuration Example

Figure 1:
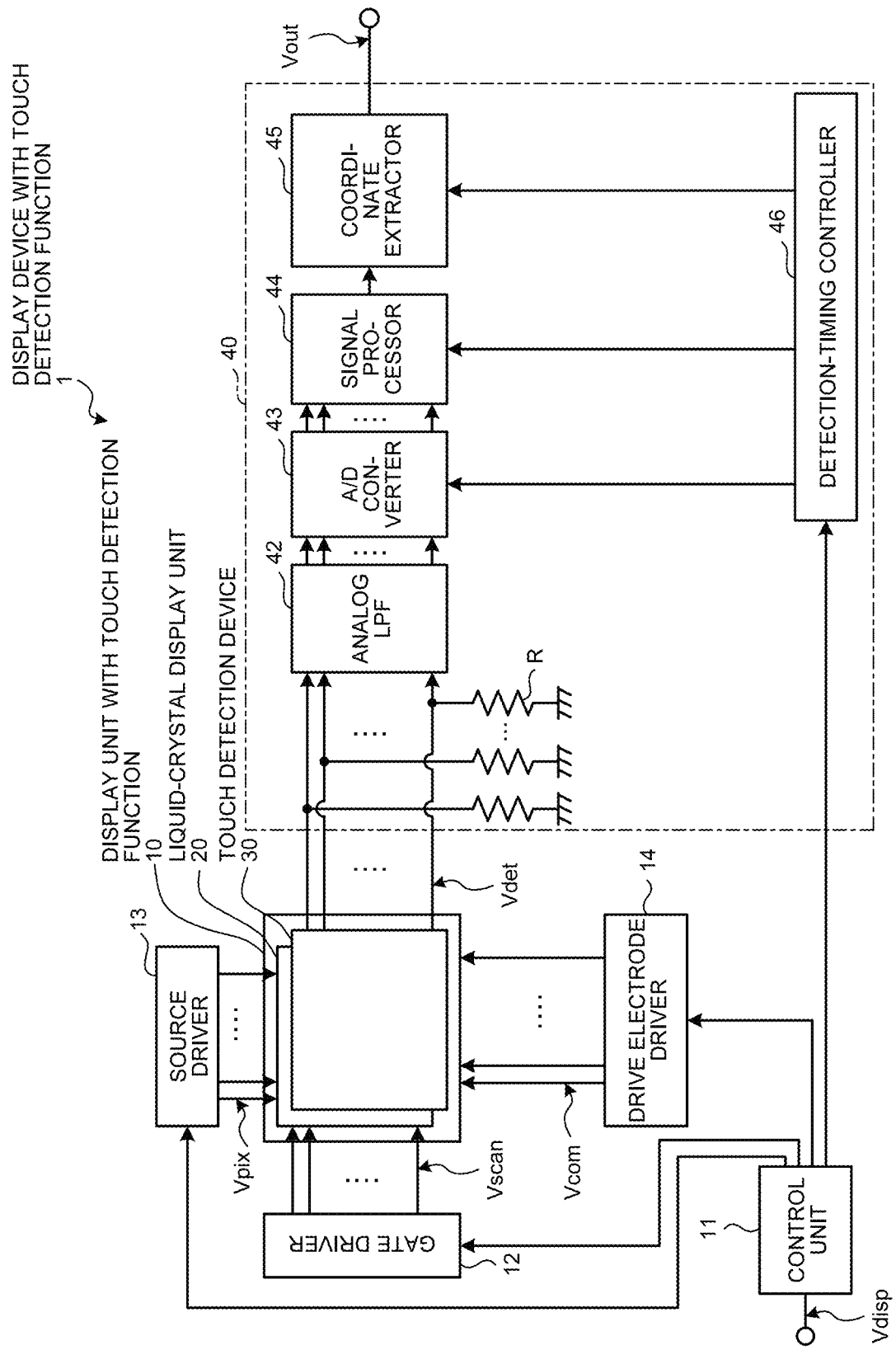
FIG. 1 is a block diagram illustrating a configuration example of a display device with a touch detection function according to a first embodiment.

FIG. 1 is a block diagram illustrating a configuration example of a display device with a touch detection function according to a first embodiment. A display device 1 with a touch detection function includes a display unit 10 with a touch detection function, a control unit 11, a gate driver 12, a source driver 13, a drive electrode driver 14, and a touch detection unit 40. The display device 1 with a touch detection function is a display unit in which the display unit 10 with a touch detection function has a touch detection function incorporated therein. The display unit 10 with a touch detection function is a so-called "in-cell" device in which a liquid-crystal display unit 20 that uses liquid-crystal display elements as display elements and a capacitive type touch detection device 30 are integrated. The display unit 10 with a touch detection function can be a so-called "on-cell" device that has the capacitive type touch detection device 30 mounted on the liquid-crystal display unit 20 that uses the liquid-crystal display elements as the display elements.

As described later, the liquid-crystal display unit 20 sequentially scans horizontal lines one by one to perform display, according to a scanning signal Vscan supplied from the gate driver 12. The control unit 11 is a circuit that supplies a control signal, respectively, to the gate driver 12, the source driver 13, the drive electrode driver 14, and the touch detection unit 40 based on a video signal Vdisp supplied from outside to control so that these units operate in synchronization.

The gate driver 12 has a function of sequentially selecting one horizontal line to be displayed by the display unit 10 with a touch detection function based on the control signal supplied from the control unit 11.

The source driver 13 is a circuit that supplies a pixel signal Vpix to each pixel Pix (each sub-pixel SPix) described later of the display unit 10 with a touch detection function based on the control signal supplied from the control unit 11. The source driver 13 generates a pixel signal in which the pixel signals Vpix of a plurality of sub-pixels SPix of the liquid-crystal display unit 20 are time-division multiplexed from the video signals for one horizontal line.

The drive electrode driver 14 is a circuit that supplies a drive signal Vcom to a drive electrode COML described later of the display unit 10 with a touch detection function based on the control signal supplied from the control unit 11.

Basic Principle of Capacitive Type Touch Detection

Figure 2:
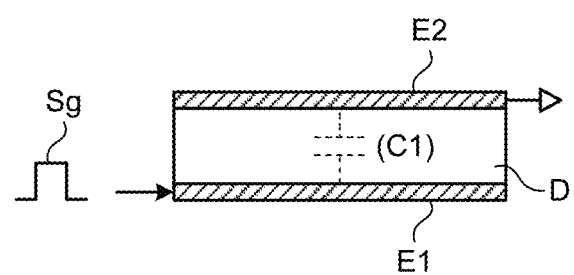
FIG. 2 is an explanatory diagram illustrating a state where a finger is not in contact with or in proximity to the display device, for explaining a basic principle of a capacitive type touch detection method.
Figure 3:
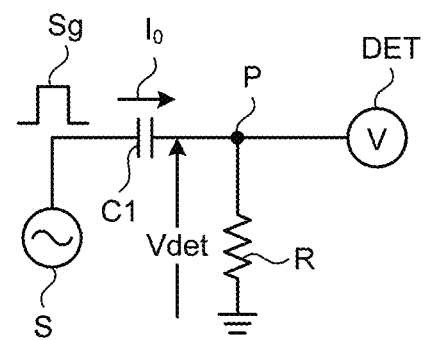
FIG. 3 is an explanatory diagram illustrating an example of an equivalent circuit in the state where a finger is not in contact with or in proximity to the display device as illustrated in FIG. 2.
Figure 4:
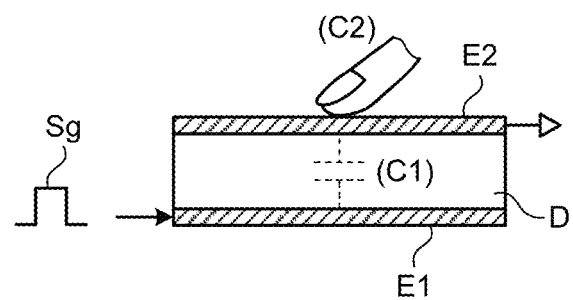
FIG. 4 is an explanatory diagram illustrating a state where a finger is in contact with or in proximity to the display device, for explaining the basic principle of the capacitive type touch detection method.
Figure 5:
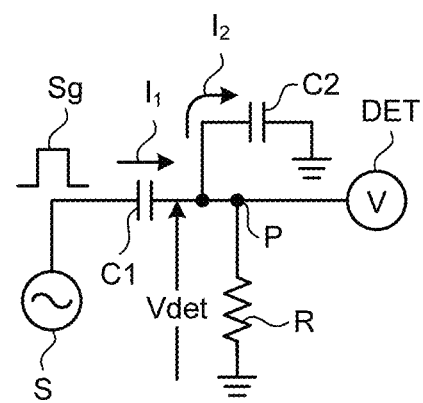
FIG. 5 is an explanatory diagram for illustrating an example of an equivalent circuit in the state where a finger is in contact with or in proximity to the display device as illustrated in FIG. 4.

The touch detection device 30 operates based on a basic principle of the capacitive type touch detection, and outputs a touch detection signal Vdet. The basic principle of touch detection in the display device with a touch detection function according to the embodiment is explained with reference to FIGS. 1 to 6. FIG. 2 is an explanatory diagram illustrating a state where a finger is not in contact with or in proximity to the display device, for explaining a basic principle of a capacitive type touch detection method. FIG. 3 is an explanatory diagram illustrating an example of an equivalent circuit in the state where a finger is not in contact with or in proximity to the display device as illustrated in FIG. 2. FIG. 4 is an explanatory diagram illustrating a state where a finger is in contact with or in proximity to the display device, for explaining the basic principle of the capacitive type touch detection method. FIG. 5 is an explanatory diagram for illustrating an example of an equivalent circuit in the state where a finger is in contact with or in proximity to the display device as illustrated in FIG. 4.

For example, as illustrated in FIGS. 2 and 4, a capacitative element C1 includes a pair of electrodes, a drive electrode E1 and a touch detection electrode E2, that are arranged opposite to each other with a dielectric body D interposed therebetween. As illustrated in FIGS. 3 and 5, one end of the capacitative element C1 is coupled to an AC signal source (drive signal source) S, and the other end P is grounded via a resistance R, and is coupled to a voltage detector (touch detection unit) DET.

When an AC square wave Sg of a predetermined frequency (for example, about several kHz to several hundreds of kHz) is applied from the AC signal source S to the drive electrode E1 (one end of the capacitative element C1), an output waveform (the touch detection signal Vdet) appears in the touch detection electrode E2 (at the other end P of the capacitative element C1). The AC square wave Sg corresponds to a touch detection drive signal Vcomt described later.

Figure 6:
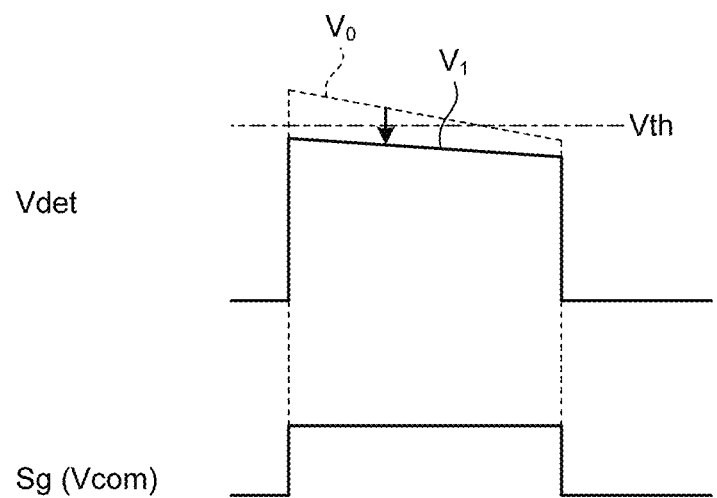
FIG. 6 illustrates an example of waveforms of a drive signal and a touch detection signal.

As illustrated in FIGS. 2 and 3, in the state where a finger is not in contact with (or in proximity to) the display device (a non-contact state), a current $I_0$ corresponding to a capacitance value of the capacitative element C1 flows with charge and discharge to the capacitative element C1. The shape of potential at the other end P of the capacitative element C1 at this time becomes a waveform $V_0$, for example, as illustrated in FIG. 6, and the voltage detector DET illustrated in FIG. 3 detects the waveform $V_0$.

On the other hand, in the state where a finger is in contact with (or in proximity to) the display device (a contact state), as illustrated in FIG. 4, a capacitance formed by the finger acts to be added to the capacitative element C1 as a capacitative element C2. In the equivalent circuit illustrated in FIG. 5, the capacitative element C2 is added to the capacitative element C1 in series. In this state, currents $I_1$ and $I_2$ flow to the capacitative elements C1 and C2 with charge and discharge to the capacitative elements C1 and C2. The shape of potential at the other end P of the capacitative element C1 at this time becomes a waveform $V_1$, for example, as illustrated in FIG. 6, and the voltage detector DET detects the waveform $V_1$. At this time, the potential at the other end P becomes a divided potential determined by the values of the currents $I_1$ and $I_2$ flowing in the capacitative elements C1 and C2. Therefore, the waveform $V_1$ has a smaller value than the waveform $V_0$ in the non-contact state. The voltage detector DET compares the detected voltage with a predetermined threshold voltage Vth. When the detected voltage is equal to or larger than the threshold voltage, the voltage detector DET determines that the state is the non-contact state, and when the detected value is smaller than the threshold voltage Vth, the voltage detector DET determines that the state is the contact state. Touch detection can be performed in this manner.

The touch detection device 30 illustrated in FIG. 1 performs touch detection by sequentially scanning a detection block one by one according to the drive signal Vcom (the touch detection drive signal Vcomt described later) supplied from the drive electrode driver 14.

The touch detection device 30 outputs the touch detection signal Vdet for each detection block from a plurality of touch detection electrodes TDL described later, and supplies the touch detection signal Vdet to the touch detection unit 40.

The touch detection unit 40 is a circuit that detects the presence of touch (the contact state described above) to the touch detection device 30 based on the control signal supplied from the control unit 11 and the touch detection signal Vdet supplied from the touch detection device 30 of the display unit 10 with a touch detection function, and obtains a coordinate thereof in a touch detection area when the presence of touch is detected. The touch detection unit 40 includes an analog LPF (Low Pass Filter) 42, an A/D convertor 43, a signal processor 44, a coordinate extractor 45, and a detection-timing controller 46.

The analog LPF 42 is a low-pass analog filter that receives the touch detection signal Vdet supplied from the touch detection device 30 as an input, removes a high frequency component (a noise component) included in the touch detection signal Vdet to extract a touch component, and output the touch component. The resistance R for applying a DC potential (0 V) is coupled between respective input terminals of the analog LPF 42 and the ground. For example, a switch can be provided instead of the resistance R to apply the DC potential (0 V) by turning on the switch at a predetermined time.

The A/D convertor 43 is a circuit that samples an analog signal output from the analog LPF 42 at a timing synchronized with the drive signal Vcom and converts the sampled analog signal to a digital signal.

The signal processor 44 includes a digital filter that removes the frequency component (the noise component) that is included in an output signal of the A/D convertor 43 and is higher than a frequency at which the touch detection signal Vdet has been sampled, and extracts the touch component. The signal processor 44 is a logical circuit that detects the presence of touch to the touch detection device 30 based on the output signal of the A/D convertor 43.

The coordinate extractor 45 is a logical circuit that obtains touch panel coordinates when a touch is detected by the signal processor 44. The detection-timing controller 46 performs control so that the A/D convertor 43, the signal processor 44, and the coordinate extractor 45 operate in synchronization.

Module

Figure 7:
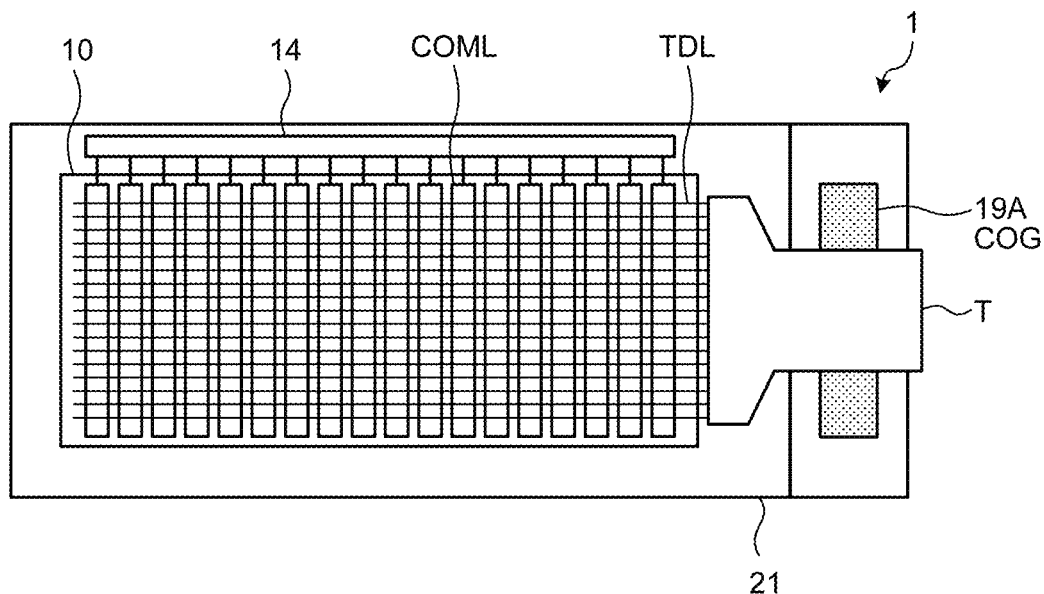
FIG. 7 illustrates an example of a module having the display device with a touch detection function mounted thereon.
Figure 8:
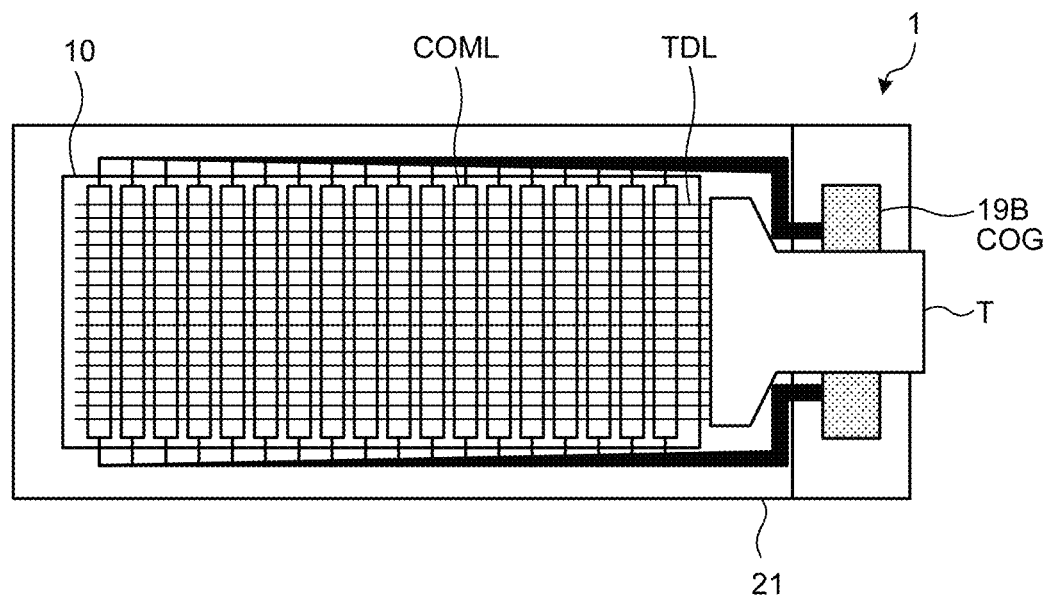
FIG. 8 illustrates an example of a module having the display device with a touch detection function mounted thereon.

FIGS. 7 and 8 illustrate an example of a module having the display device with a touch detection function mounted thereon. As illustrated in FIG. 7, the display device 1 with a touch detection function can form the drive electrode driver 14 described above on a glass TFT substrate 21 when the display device 1 with a touch detection function is mounted on a module.

As illustrated in FIG. 7, the display device 1 with a touch detection function includes the display unit 10 with a touch detection function, the drive electrode driver 14, and a COG (Chip On Glass) 19A. The display unit 10 with a touch detection function is a so-called "landscape" type (horizontally long). In the display unit 10 with a touch detection function, the drive electrodes COML and the touch detection electrodes TDL formed to intersect the drive electrodes COML in grade separation are schematically illustrated in a vertical direction to a surface of the TFT substrate described later. That is, the drive electrodes COML are formed along a short-side direction of the display unit 10 with a touch detection function, and the touch detection electrodes TDL are formed along a long-side direction of the display unit 10 with a touch detection function. An output of each touch detection electrode TDL is provided on the short side of the display unit 10 with a touch detection function, and is coupled to the touch detection unit 40 mounted on outside of the module via a terminal portion T configured by a flexible substrate or the like. The drive electrode driver 14 is formed on the TFT substrate 21, which is a glass substrate. The COG 19A is a chip mounted on the TFT substrate 21, and has incorporated therein respective circuits required for a display operation such as the control unit 11, the gate driver 12, and the source driver 13 illustrated in FIG. 1. As illustrated in FIG. 8, the display device 1 with a touch detection function can have the drive electrode driver 14 incorporated in a COG (Chip On Glass) 19B.

In the configuration illustrated in FIG. 8, the display device 1 with a touch detection function includes the COG 19B. The COG 19B illustrated in FIG. 8 further has incorporated therein the drive electrode driver 14 in addition to the respective circuits required for the display operation described above.

In this manner, the display device 1 with a touch detection function illustrated in FIGS. 7 and 8 outputs the touch detection signal Vdet from the short side of the display unit 10 with a touch detection function. Therefore, the display device 1 with a touch detection function can reduce the number of touch detection electrodes TDL, thereby facilitating a wiring arrangement at the time of coupling to the touch detection unit 40 via the terminal portion T. Because the display device 1 with a touch detection function illustrated in FIG. 8 incorporates the drive electrode driver 14 in the COG 19B, a frame thereof can be made narrow.

Display Unit 10 with Touch Detection Function

A configuration example of the display unit 10 with a touch detection function is explained next in detail.

Figure 9:
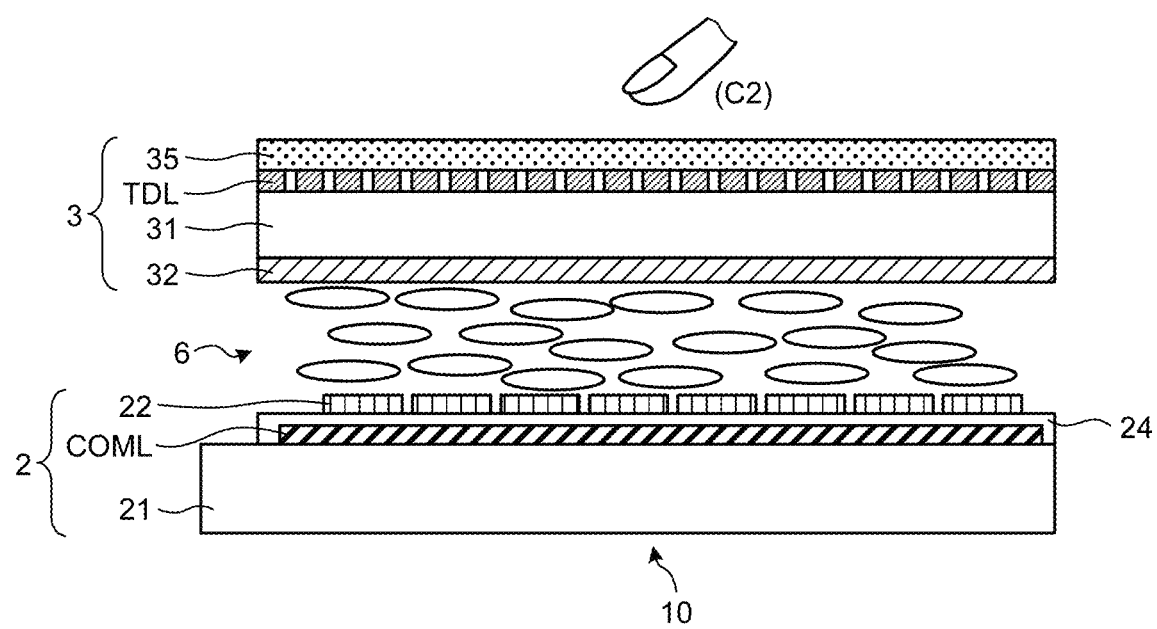
FIG. 9 is a sectional view illustrating a schematic sectional structure of a display unit with a touch detection function according to the first embodiment.
Figure 10:
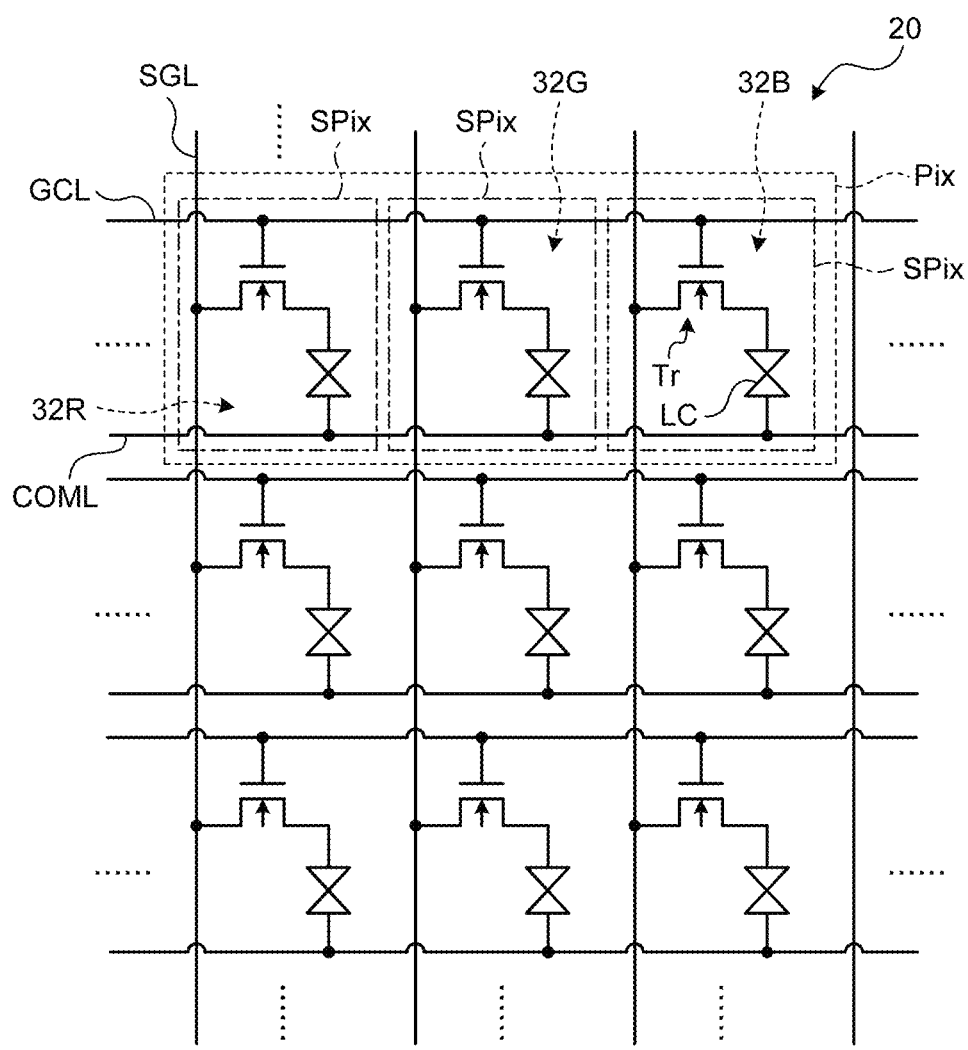
FIG. 10 is a circuit diagram illustrating a pixel arrangement of the display unit with a touch detection function according to the first embodiment.

FIG. 9 is a sectional view illustrating a schematic sectional structure of the display unit with a touch detection function according to the first embodiment. FIG. 10 is a circuit diagram illustrating a pixel arrangement of the display unit with a touch detection function according to the first embodiment. The display unit 10 with a touch detection function includes a pixel substrate 2, a counter substrate 3 arranged opposite to the surface of the pixel substrate 2 in a vertical direction thereto, and a liquid crystal layer 6 interposed between the pixel substrate 2 and the counter substrate 3.

The pixel substrate 2 includes the TFT substrate 21 as a circuit substrate, a plurality of pixel electrodes 22 arranged in a matrix on the TFT substrate 21, a plurality of drive electrodes COML formed between the TFT substrate 21 and the pixel electrodes 22, and an insulation layer 24 that insulates between the pixel electrodes 22 and the drive electrodes COML. As illustrated in FIG. 10, the TFT substrate 21 includes a thin film transistor (TFT) element Tr provided for each sub-pixel SPix and wiring such as a pixel signal line SGL for supplying the pixel signal Vpix to pixel electrodes 22, and a scanning signal line GCL that drive TFT elements Tr. In this manner, the pixel signal line SGL extends on a plane parallel to the surface of the TFT substrate 21 to supply an image signal for displaying an image on a pixel. The liquid-crystal display unit 20 illustrated in FIG. 10 has the sub-pixels SPix arranged in a matrix. Each sub-pixel SPix includes the TFT element Tr and a liquid crystal element LC. The TFT element Tr is constituted by a thin film transistor, and constituted by an n-channel MOS (Metal Oxide Semiconductor) TFT in this example. A source of the TFT element is coupled to the pixel signal line SGL, a gate thereof is coupled to the scanning signal line GCL, and a drain thereof is coupled to one end of the liquid crystal element LC. One end of the liquid crystal element LC is coupled to the drain of the TFT element Tr, and the other end is coupled to the drive electrode COML.

The sub-pixel SPix is coupled to other sub-pixels SPix belonging to the same row of the liquid-crystal display unit 20 by the scanning signal line GCL. The scanning signal line GCL is coupled to the gate driver 12, and supplied with the scanning signal Vscan from the gate driver 12. The sub-pixel SPix is also coupled to other sub-pixels SPix belonging to the same column of the liquid-crystal display unit 20 by the pixel signal line SGL. The pixel signal line SGL is coupled to the source driver 13, and supplies with the pixel signal Vpix from the source driver 13. Furthermore, the sub-pixel SPix is coupled to other sub-pixels SPix belonging to the same row of the liquid-crystal display unit 20 by the drive electrode COML. The drive electrode COML is coupled to the drive electrode driver 14, and supplied with the drive signal Vcom from the drive electrode driver 14. That is, in this example, the sub-pixels SPix belonging to the same row share one drive electrode COML.

By applying the scanning signal Vscan to the gate of the TFT elements Tr of the sub-pixel SPix via the scanning signal line GCL illustrated in FIG. 10, the gate driver 12 illustrated in FIG. 1 sequentially selects one row (one horizontal line) of the sub-pixels SPix formed in the matrix on the liquid-crystal display unit 20 as a display target. The source driver 13 illustrated in FIG. 1 supplies the pixel signal Vpix to the respective sub-pixels SPix constituting one horizontal line to be selected sequentially by the gate driver 12 via the pixel signal line SGL illustrated in FIG. 10. In the sub-pixels SPix, one horizontal line is displayed according to the supplied pixel signal Vpix. The drive electrode driver 14 illustrated in FIG. 1 drives the drive electrodes COML in a unit of a block each including a predetermined number of drive electrodes COML illustrated in FIGS. 9 and 10 by applying the drive signal Vcom thereto.

As described above, in the liquid-crystal display unit 20, the gate driver 12 drives the scanning signal line GCL so as to perform line sequential scanning in a time divisional manner, and one horizontal line is sequentially selected. Further, in the liquid-crystal display unit 20, the source driver 13 supplies the pixel signals Vpix to the pixels Pix belonging to one horizontal line, thereby performing display for each horizontal line. At the time of performing the display operation, the drive electrode driver 14 applies the drive signal Vcom to the block including the drive electrode COML corresponding to the one horizontal line.

The counter substrate 3 includes a glass substrate 31, and a color filter 32 formed on a surface of the glass substrate 31. The touch detection electrode TDL, which is a detection electrode of the touch detection device 30, is formed on the other surface of the glass substrate 31, and a polarization plate 35 is arranged on the touch detection electrode TDL.

The color filter 32 includes color regions 32R, 32G, and 32B colored in three colors of red (R), green (G), and blue (B). The color filter 32 faces the pixel electrodes 22 in the vertical direction to the TFT substrate 21, and overlaps with them as viewed in the vertical direction to the surface of the TFT substrate 21. The color filter 32 is matched with the pixel Pix as one set, in which the color regions 32R, 32G, and 32B colored in three colors of red (R), green (G), and blue (B) are matched with each sub-pixel SPix illustrated in FIG. 10 by cyclically arranging color filters colored in, for example, three colors of red (R), green (G), and blue (B). The color filter 32 faces the liquid crystal layer 6 in the vertical direction to the TFT substrate 21. The color filter 32 can use a combination of other colors, when the filters are colored in different colors.

The drive electrode COML according to the present embodiment functions as a common electrode (common drive electrode) of the liquid-crystal display unit 20, and also functions as a drive electrode of the touch detection device 30. In the embodiment, one drive electrode COML is arranged so as to correspond to one pixel electrode 22 (a pixel electrode 22 constituting one row). The insulation layer 24 insulates between the pixel electrode 22 and the drive electrode COML, and insulates between the pixel electrode 22 and the pixel signal line SGL formed on the surface of the TFT substrate 21. The drive electrode COML faces the pixel electrode 22 in the vertical direction to the surface of the TFT substrate 21, and extends in a direction parallel to the extending direction of the scanning signal line CGL.

The liquid crystal layer 6 modulates light passing therethrough according to the state of electric fields, and a liquid-crystal display unit using a liquid crystal of horizontal electric-field mode, such as FFS (fringe field switching) mode and IPS (in-plane switching) mode, can be used. An orientation film can be arranged, respectively, between the liquid crystal layer 6 and the pixel substrate 2, and the liquid crystal layer 6 and the counter substrate 3 illustrated in FIG. 9.

The orientation film can be respectively arranged between the liquid crystal layer 6 and the pixel substrate 2, and the liquid crystal layer 6 and the counter substrate 3, and an incident-side polarization plate can be arranged on the lower surface side of the pixel substrate 2.

Figure 11:
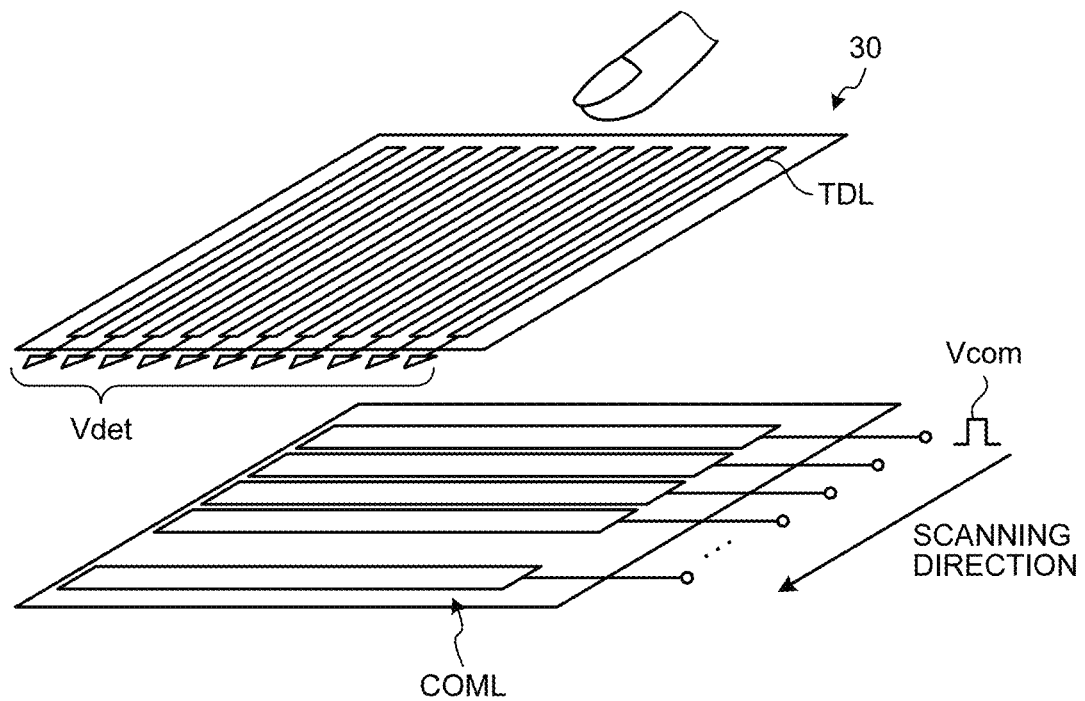
FIG. 11 is a perspective view illustrating a configuration example of drive electrodes and touch detection electrodes of the display unit with a touch detection function according to the first embodiment.

FIG. 11 is a perspective view illustrating a configuration example of the drive electrodes and the touch detection electrodes of the display unit with a touch detection function according to the first embodiment. The touch detection device 30 includes the drive electrodes COML and the touch detection electrodes TDL. The drive electrodes COML are provided as a plurality of stripe electrode patterns extending in a horizontal direction in FIG. 11. When the touch detection operation is performed, the drive signal Vcom is sequentially supplied to the respective electrode patterns by the drive electrode driver 14, so as to perform line sequential scanning in the time divisional manner as described below. The touch detection electrodes TDL are provided as the stripe electrode patterns extending in a direction orthogonal to an extending direction of the electrode patterns of the drive electrodes COML. The touch detection electrodes TDL face the drive electrodes COML in the vertical direction to the surface of the TFT substrate 21. The respective electrode patterns of the touch detection electrodes TDL are respectively coupled to an input of the analog LPF 42 of the touch detection unit 40. The electrode patterns in which the drive electrodes COML and the touch detection electrodes TDL intersect each other generate a capacitance at intersections thereof.

According to the configuration, in the touch detection device 30, at the time of performing the touch detection operation, the drive electrode driver 14 sequentially selects one detection block of the drive electrodes COML by performing the drive to line-sequentially scan the drive electrodes COML as the drive electrode block in the time divisional manner, and touch detection of one detection block is performed by outputting the touch detection signals Vdet from the touch detection electrodes TDL. That is, the drive electrode block corresponds to the drive electrode E1 in the basic principle of touch detection described above, and the touch detection electrode TDL corresponds to the touch detection electrode E2. The touch detection device 30 detects touch according to the basic principle. As illustrated in FIG. 11, the electrode patterns that intersect each other constitutes capacitive type touch sensors in a matrix. Accordingly, when the entire touch detection surface of the touch detection device 30 is scanned, a position where contact or proximity of an external proximity object has occurred therein can be detected.

The TFT substrate 21 corresponds to a specific example of "substrate" according to the present disclosure. The pixel electrode 22 corresponds to a specific example of "pixel electrode" according to the present disclosure. The scanning signal line GCL corresponds to a specific example of "scanning signal line" according to the present disclosure. The drive electrode COML corresponds to a specific example of "drive electrode" according to the present disclosure. The touch detection electrode TDL corresponds to a specific example of "touch detection electrode" according to the present disclosure. The liquid crystal element LC corresponds to a specific example of "display functional layer" according to the present disclosure. The source driver 13 and the drive electrode driver 14 correspond to a specific example of "scanning drive unit" according to the present disclosure. The touch detection unit 40 corresponds to a specific example of "detection processing unit" according to the present disclosure. The touch detection electrode TDL corresponds to "touch detection electrode" according to the present disclosure. The color filter 32 corresponds to "color filter" according to the present disclosure.

1-1B. Operations and Functions

Subsequently, operations and functions of the display device 1 with a touch detection function according to the first embodiment are explained below.

Because the drive electrode COML functions as the common drive electrode of the liquid-crystal display unit 20, and also functions as the drive electrode of the touch detection device 30, the drive signal Vcom may cause influence on each other. Therefore, the drive signal Vcom is applied to the drive electrode COML separately in a display period B for performing a display operation and a touch detection period A for performing a touch detection operation. The drive electrode driver 14 applies the drive signal Vcom as a display drive signal in the display period B for performing the display operation. The drive electrode driver 14 applies the drive signal Vcom as the touch detection drive signal in the touch detection period A for performing the touch detection operation. In the following explanations, the drive signal Vcom as the display drive signal may be described as a display drive signal Vcomd, and the drive signal Vcom as the touch detection drive signal may be described as a touch detection drive signal Vcomt.

Outline of Entire Operation

The control unit 11 supplies a control signal respectively to the gate driver 12, the source driver 13, the drive electrode driver 14, and the touch detection unit 40 based on the video signal Vdisp supplied from outside, and controls these units to operate in synchronization with each other. The gate driver 12 supplies the scanning signal Vscan to the liquid-crystal display unit 20 in the display period B, and sequentially selects one horizontal line as a display target. The source driver 13 supplies the pixel signals Vpix to the respective pixels Pix that constitute one horizontal line selected by the gate driver 12 in the display period B.

The drive electrode driver 14 applies the display drive signal Vcomd to the drive electrode block corresponding to one horizontal line in the display period B, and sequentially applies the touch detection drive signal Vcomt of a frequency higher than that of the display drive signal Vcomd to the drive electrode block corresponding to a touch detection operation to select one detection block sequentially in the touch detection period A. In the display period B, the display unit 10 with a touch detection function performs the display operation based on signals supplied from the gate driver 12, the source driver 13, and the drive electrode driver 14. In the touch detection period A, the display unit 10 with a touch detection function performs the touch detection operation based on the signal supplied from the drive electrode driver 14, and outputs the touch detection signal Vdet from the touch detection electrode TDL. The analog LPF 42 amplifies and outputs the touch detection signal Vdet. The A/D convertor 43 converts an analog signal output from the analog LPF 42 to a digital signal at a timing synchronized with the touch detection drive signal Vcomt. The signal processor 44 detects the presence of touch to the touch detection device 30 based on an output signal from the A/D convertor 43. When a touch is detected by the signal processor 44, the coordinate extractor 45 obtains a touch panel coordinate thereof, and outputs an output signal Vout. The control unit 11 controls the detection-timing controller 46 to change a sampling frequency of the touch detection drive signal Vcomt.

Detailed Operation

Figure 12:
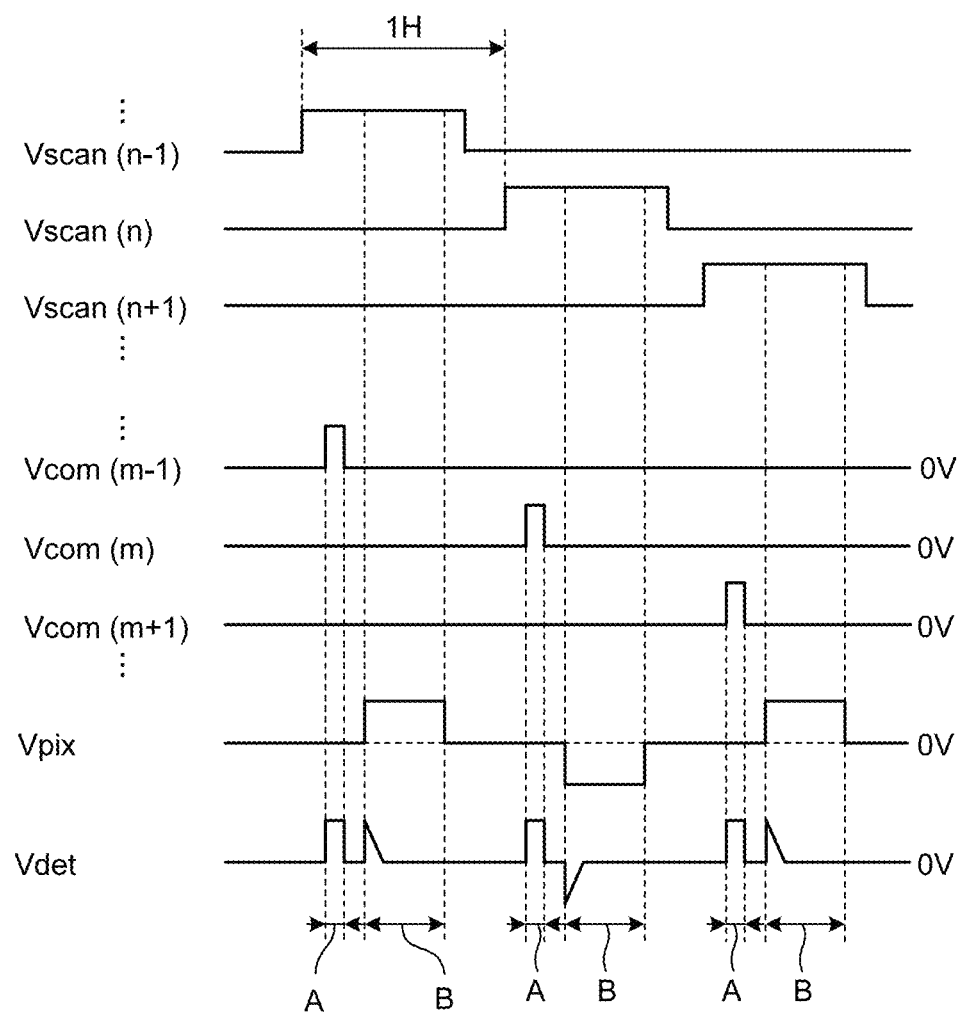
FIG. 12 is a timing waveform diagram illustrating an operation example of the display device with a touch detection function according to the first embodiment.

A detailed operation of the display device 1 with a touch detection function is explained next. FIG. 12 is a timing waveform diagram illustrating an operation example of the display device with a touch detection function according to the first embodiment. As illustrated in FIG. 12, the liquid-crystal display unit 20 sequentially scans the horizontal lines one by one on the adjacent (n−1)-th row, the n-th row, and the (n+1)-th row of the scanning signal lines GCL to perform display according to the scanning signal Vscan supplied from the gate driver 12. Similarly, the drive electrode driver 14 supplies the drive signal to the adjacent (m−1)-th row, the m-th row, and the (m+1)-th row of the drive electrodes COML of the display unit 10 with a touch detection function based on the control signal supplied from the control unit 11.

In this manner, the display device 1 with a touch detection function performs a touch detection operation (the touch detection period A) and a display operation (the display period B) in the time divisional manner for each display horizontal period 1H. In the touch detection operation, the display device 1 with a touch detection function selects a different drive electrode COML for each display horizontal period 1H and applies the drive signal Vcom thereto, thereby to perform scanning of touch detection. The operation thereof is explained below in detail.

First, the gate driver 12 applies the scanning signal Vscan to the scanning signal line GCL on the (n−1)-th row, and the scanning signal Vscan(n−1) changes from a low level to a high level. Accordingly, one display horizontal period 1H starts.

Next, in the touch detection period A, the drive electrode driver 14 applies the drive signal Vcom to the drive electrode COML on the (m−1)-th row, and the drive signal Vcom(m−1) changes from a low level to a high level. The drive signal Vcom(m−1) is transmitted to the touch detection electrode TDL via the capacitance, and the touch detection signal Vdet changes. When the drive signal Vcom(m−1) changes from the high level to the low level, the touch detection signal Vdet also changes. The waveform of the touch detection signal Vdet in the touch detection period A corresponds to that of the touch detection signal Vdet in the basic principle of touch detection as described above. The A/D convertor 43 performs A/D conversion on the touch detection signal Vdet in the touch detection period A, and the signal processor 44 performs touch detection. Thus, the display device 1 with a touch detection function performs touch detection of one detection line.

Next, in the display period B, the source driver 13 applies the pixel signal Vpix to the pixel signal line SGL to perform display of one horizontal line. As illustrated in FIG. 12, a change in the pixel signal Vpix is transmitted to the touch detection electrode TDL via a parasitic capacitance, and the touch detection signal Vdet can change. However, the A/D convertor 43 does not perform A/D conversion in the display period B, thereby enabling to suppress the influence of the change in the pixel signal Vpix with respect to touch detection. After the supply of the pixel signal Vpix by the source driver 13 is complete, the gate driver 12 changes the scanning signal Vscan of the scanning signal line GCL on the (n−1)-th row from the high level to the low level, and the one display horizontal period 1H finishes.

Next, the gate driver 12 applies the scanning signal Vscan to the scanning signal line GCL on the n-th row different from the previous row, and the scanning signal Vscan(n) changes from the low level to the high level. Accordingly, the next display horizontal period 1H starts.

In the next touch detection period A, the drive electrode driver 14 applies the drive signal Vcom to the drive electrode COML on the m-th row different from the previous column. The A/D convertor 43 performs A/D conversion on the change in the touch detection signal Vdet, and thus the touch detection of one detection line is performed.

Next, in the display period B, the source driver 13 applies the pixel signal Vpix to the pixel signal line SGL to perform display of one horizontal line. Because the display device 1 with a touch detection function according to the present embodiment performs inversion drive, the polarity of the pixel signal Vpix applied by the source driver 13 is inverted as compared with that of the previous display horizontal period 1H. After the display period B has finished, the one display horizontal period 1H finishes.

Thereafter, by repeating the operation described above, the display device 1 with a touch detection function performs the display operation by performing scanning over the entire display surface, and performs the touch detection operation by performing scanning over the entire touch detection surface.

As described above, the display device 1 with a touch detection function performs the touch detection operation in the touch detection period A, and the display operation in the display period B in one display horizontal period 1H. In this manner, because the touch detection operation and the display operation are performed in different periods, both the display operation and the touch detection operation can be performed in the same one display horizontal period 1H, and the influence of the display operation with respect to touch detection can be suppressed.

Arrangement of Touch Detection Electrodes

Figure 13:
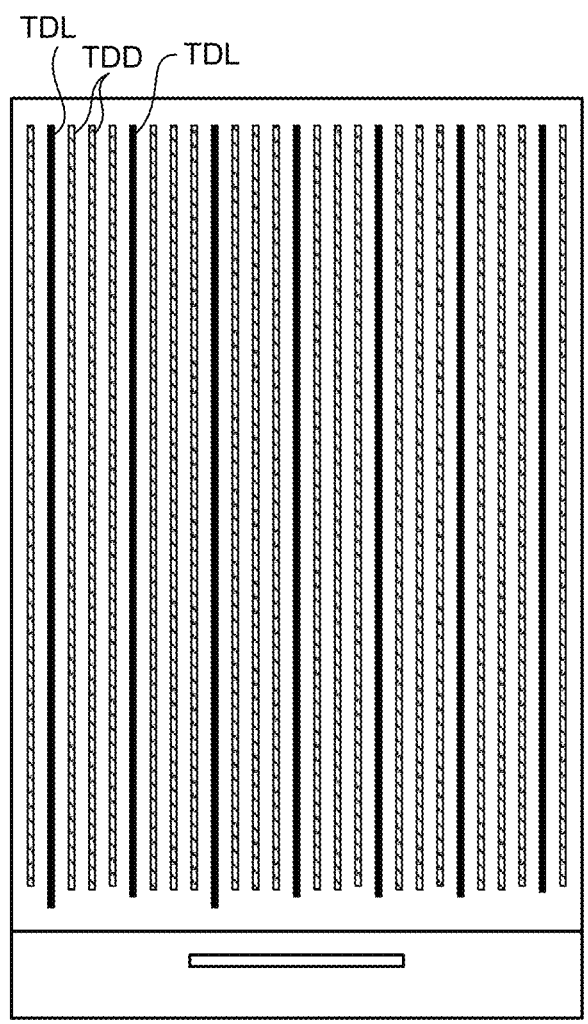
FIG. 13 is a schematic diagram illustrating an arrangement of touch detection electrodes according to the first embodiment.

FIG. 13 is a schematic diagram illustrating an arrangement of touch detection electrodes according to the first embodiment. The touch detection electrodes TDL illustrated in FIG. 13 extend in a direction different from an extending direction of the scanning signal line GCL illustrated in FIG. 10. The touch detection electrodes TDL are arranged with a predetermined pitch. In the touch detection electrode TDL, a transparent conducting oxide such as ITO (Indium Tin Oxide) is used as a material of the transparent electrode. The touch detection electrode TDL is transparent, but has a predetermined refraction index. Therefore, in the display device 1 with a touch detection function, a dummy electrode TDD is provided between transparent electrode patterns of the touch detection electrodes TDL, so that the touch detection electrodes are made invisible and less noticeable on human eyes.

Therefore, as illustrated in FIG. 13, in the counter substrate 3, the dummy electrode TDD, which is not coupled to the touch detection unit 40, is arranged between the touch detection electrodes TDL and parallel to the extending direction of the touch detection electrodes TDL. The dummy electrode TDD is formed of the same material as that of the touch detection electrode TDL. Therefore, visibility of the touch detection electrodes TDL is mitigated.

Figure 14:
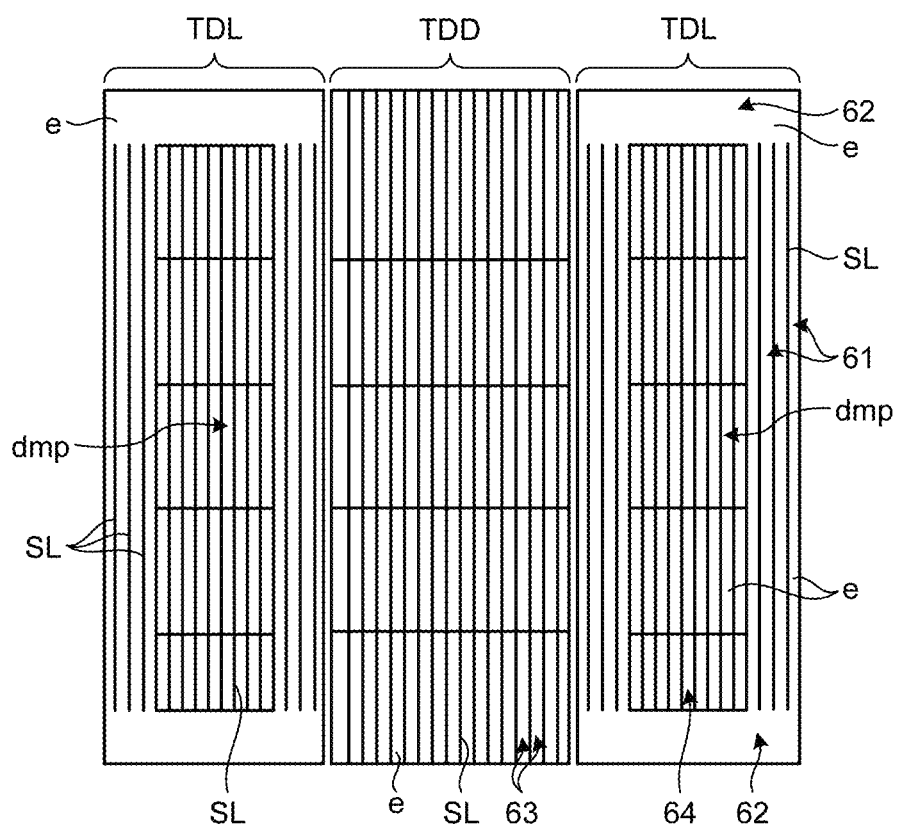
FIG. 14 is a schematic diagram illustrating an enlarged view of the touch detection electrodes according to the first embodiment.
Figure 15:
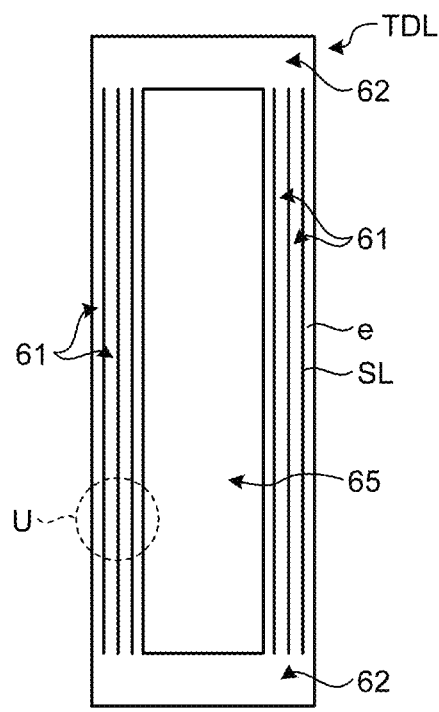
FIG. 15 is another schematic diagram illustrating an enlarged view of the touch detection electrodes according to the first embodiment.
Figure 16:
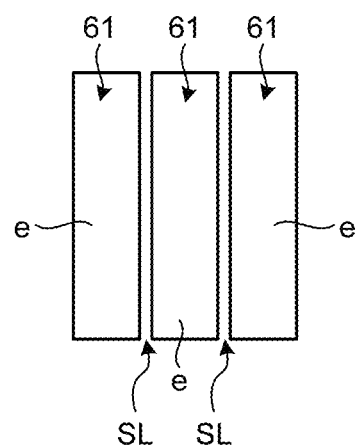
FIG. 16 is another schematic diagram illustrating an enlarged view of the touch detection electrodes according to the first embodiment.

FIGS. 14, 15, and 16 are schematic diagrams illustrating an enlarged view of the touch detection electrodes according to the first embodiment. FIG. 14 is a specific enlarged view illustrating the touch detection electrode TDL and the dummy electrode TDD illustrated in FIG. 13. FIG. 15 is an enlarged view illustrating the touch detection electrode TDL illustrated in FIG. 14. FIG. 16 is an enlarged view illustrating a slit at a position U in the transparent electrode pattern of the touch detection electrode TDL illustrated in FIG. 15.

As illustrated in FIGS. 14, 15, and 16, the touch detection electrode TDL includes detection electrode patterns 61, and a detection-electrodes conductive portions 62 that conduct between the detection electrode patterns 61. The detection electrode patterns 61 and the detection-electrodes conductive portions 62 forms a pattern of a transparent conductive body e such as ITO that surrounds the periphery of a non-detection area 65.

The detection electrode patterns 61 are transparent, but have a predetermined refraction index. Therefore, in the display device 1 with a touch detection function, one or more slits SL in which there is no transparent conductive body e such as ITO is provided in each detection electrode pattern 61 of the touch detection electrode TDL, so that the touch detection electrodes TDL are made invisible and less noticeable on human eyes.

Similarly, dummy pattern dmp is arranged in the non-detection area 65 surrounded by the detection electrode patterns 61 illustrated in FIG. 15 by using the transparent conductive body e such as ITO as illustrated in FIG. 14, so that the touch detection electrodes TDL are made invisible and less noticeable on human eyes. The dummy pattern dmp is partitioned into reed-shaped dummy patterns 64 by one or more slits SL.

The dummy electrode TDD illustrated in FIG. 14 is partitioned into reed-shaped dummy patterns 63 of the transparent conductive body e such as ITO by the slits SL described above. The slit SL described above also partitions the dummy electrode TDD and the touch detection electrode TDL. The slit SL between the dummy electrode TDD and the touch detection electrode TDL and the slit SL in the detection electrode patterns 61, the dummy pattern dmp, and the dummy electrode TDD are arranged with an equal interval.

Figure 17:
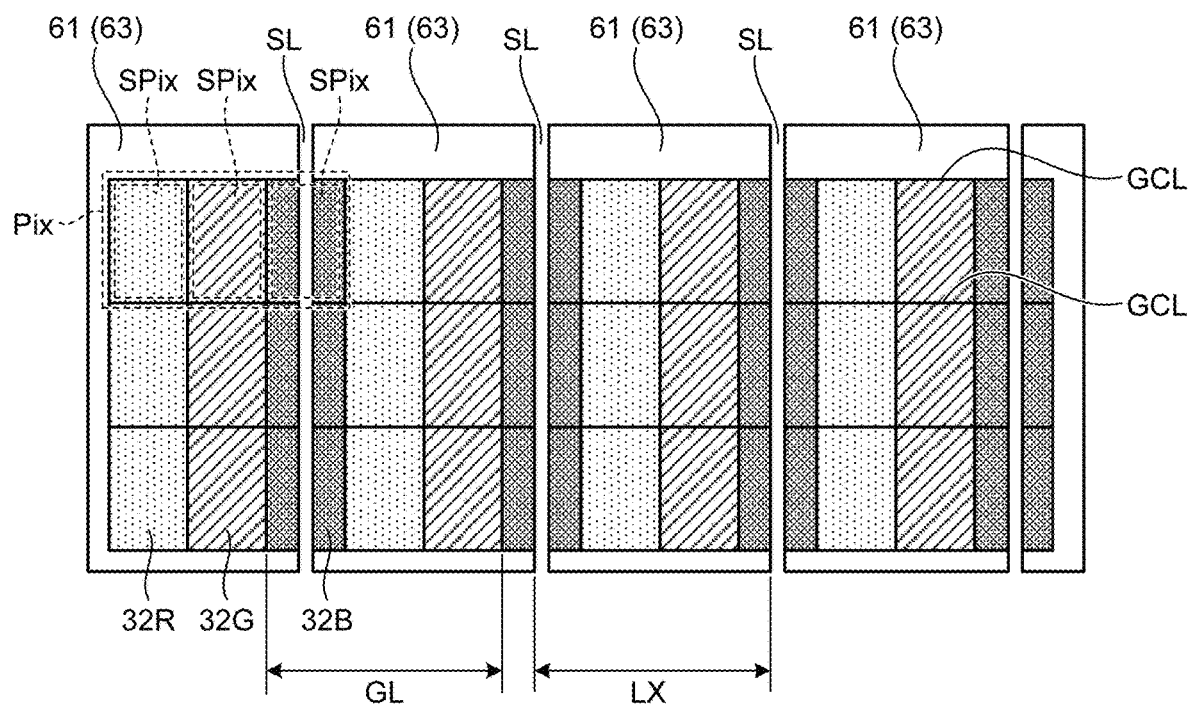
FIG. 17 is a schematic diagram for explaining a relation between an arrangement of the touch detection electrodes and color regions of a color filter according to the first embodiment.
Figure 18:
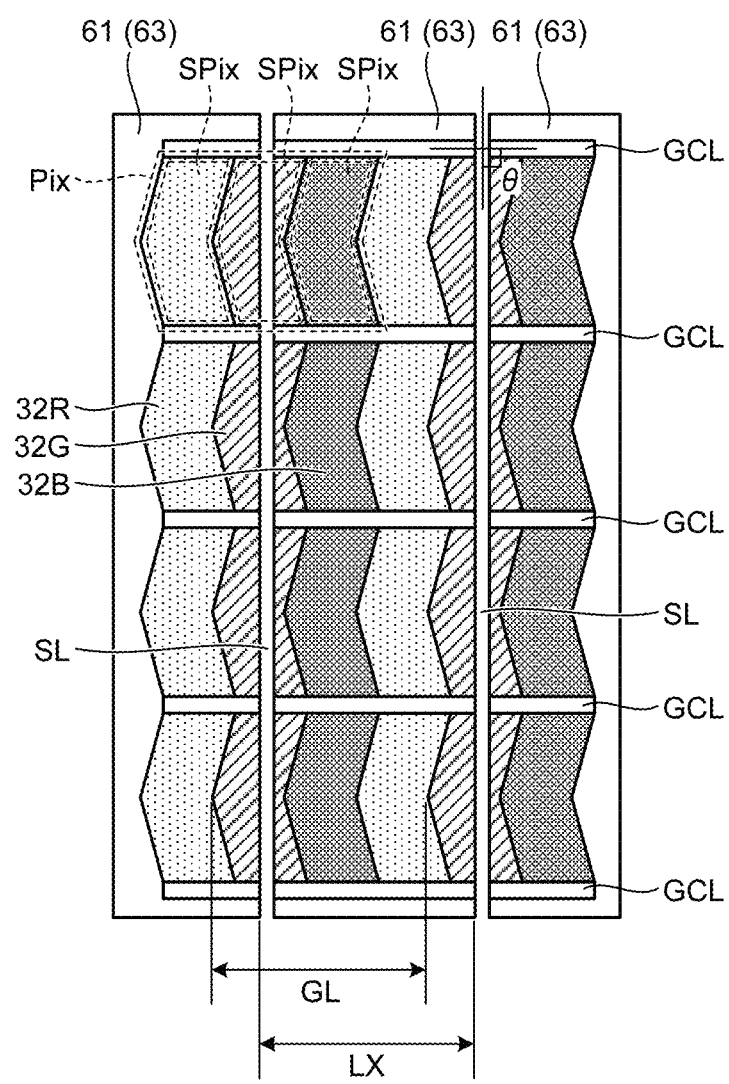
FIG. 18 is a schematic diagram for explaining a specific example of the relation between the arrangement of the touch detection electrodes and the color regions of the color filter illustrated in FIG. 17.

FIG. 17 is a schematic diagram for explaining a relation between an arrangement of the touch detection electrodes and color regions of the color filter according to the first embodiment. FIG. 18 is a schematic diagram for explaining a specific example of the relation between the arrangement of the touch detection electrodes and the color regions of the color filter illustrated in FIG. 17. As illustrated in FIGS. 17 and 18, the color filter 32 includes color regions 32R, 32G, and 32B colored in three colors of red (R), green (G), and blue (B). Normally, the color regions 32R, 32G, and 32B respectively extend in a direction to intersect the extending direction of the scanning signal line GCL in grade separation and orthogonal thereto. Furthermore, the detection electrode patterns 61 of the touch detection electrodes TDL illustrated in FIG. 17 extend in the direction to intersect the extending direction of the scanning signal line GCL in grade separation and orthogonal thereto. The slit SL is a straight line, as illustrated in FIG. 18, extending in the direction orthogonal to the scanning signal line GCL.

As described above, the color filter 32 is matched with the pixel Pix as one set, in which the color regions 32R, 32G, and 32B colored in three colors of red (R), green (G), and blue (B) are matched with each sub-pixel SPix. When it is assumed that a pitch of the pixel Pix (a pitch of one set of the sub-pixels SPix) in the extending direction of the scanning signal line GCL is a pixel pitch GL, and a pitch of the slit SL in the extending direction of the scanning signal line GCL is a slit pitch LX, the slit pitch LX is multiples of a natural number of the pixel pitch GL.

In this manner, the slits SL in the detection electrode patterns 61 of the touch detection electrodes TDL are arranged with an interval of multiples of a natural number (for example, one time) of the pitch of the pixel Pix of the pixel electrodes 22 arranged in the matrix. Further, the slits SL in the dummy patterns 63 and 64 are also arranged with the interval of multiples of a natural number (for example, one time) of the pitch of the pixel Pix of the pixel electrodes 22 arranged in the matrix.

Operational Effect

There may be a difference in optical wavelengths according to the presence or nonpresence of the transparent conductive body e, between light that is emitted from the pixel Pix of the liquid-crystal display unit 20, passes through the detection electrode pattern 61 of the touch detection electrode TDL or the dummy pattern 63 or 64, and reaches human and light that is emitted from the pixel Pix of the liquid-crystal display unit 20, passes through the slit SL, and reaches human. The difference in the optical wavelengths appears as a change in color to be displayed originally, and Moire fringes may become visible according to a field angle at which the human watches the display unit 10 with a touch detection function.

As described above, the slits SL according to the first embodiment are arranged with the interval of multiples of a natural number (for example, one time) of the pitch of the pixel Pix of the pixel electrodes 22 arranged in the matrix. Therefore, the slit SL according to the first embodiment overlaps regions of a specific color as viewed in the vertical direction to the surface of the TFT substrate 21. For example, as illustrated in FIG. 17, the slit SL overlaps the specific color regions 32B as viewed in the vertical direction to the surface of the TFT substrate 21. Alternatively, as illustrated in FIG. 18, the slit SL overlaps the specific color regions 32G as viewed in the vertical direction to the surface of the TFT substrate 21. Therefore, in the display device 1 with a touch detection function according to the first embodiment, the slit SL does not cause a variation of a decrease of transmittance between pixels Pix.

Furthermore, the display device 1 with a touch detection function according to the first embodiment can reduce the influence of the slits SL as compared with a case where the slit SL is provided for each sub-pixel SPix. As a result, in the display device 1 with a touch detection function according to the first embodiment, the possibility of causing a difference in the optical wavelengths due to the presence or nonpresence of the transparent conductive body e can be suppressed. Therefore, the display device 1 with a touch detection function according to the first embodiment can suppress the possibility of shifting the color to be displayed originally by the liquid-crystal display unit 20. As a result, the display unit 10 with a touch detection function according to the first embodiment can decrease the possibility in which Moire fringes become visible according to the visual field angle.

1-2. Second Embodiment

Figure 19:
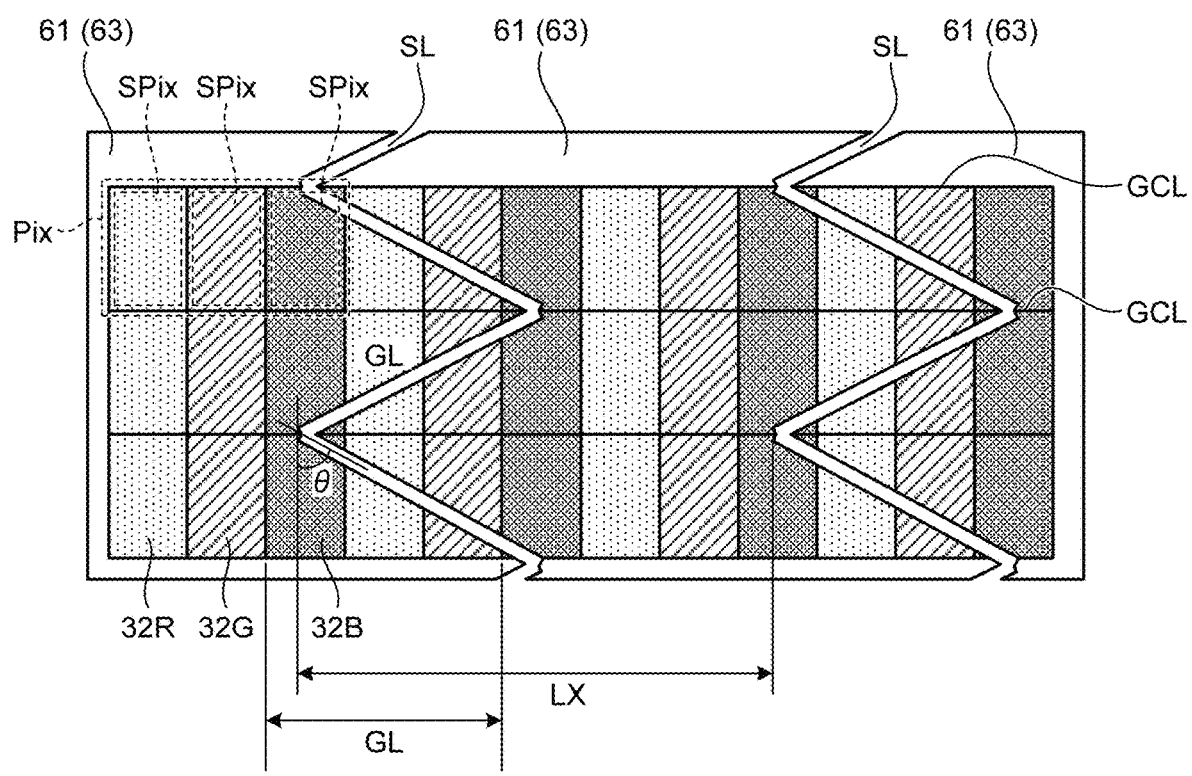
FIG. 19 is a schematic diagram for explaining a relation between an arrangement of touch detection electrodes and color regions of a color filter according to a second embodiment.
Figure 20:
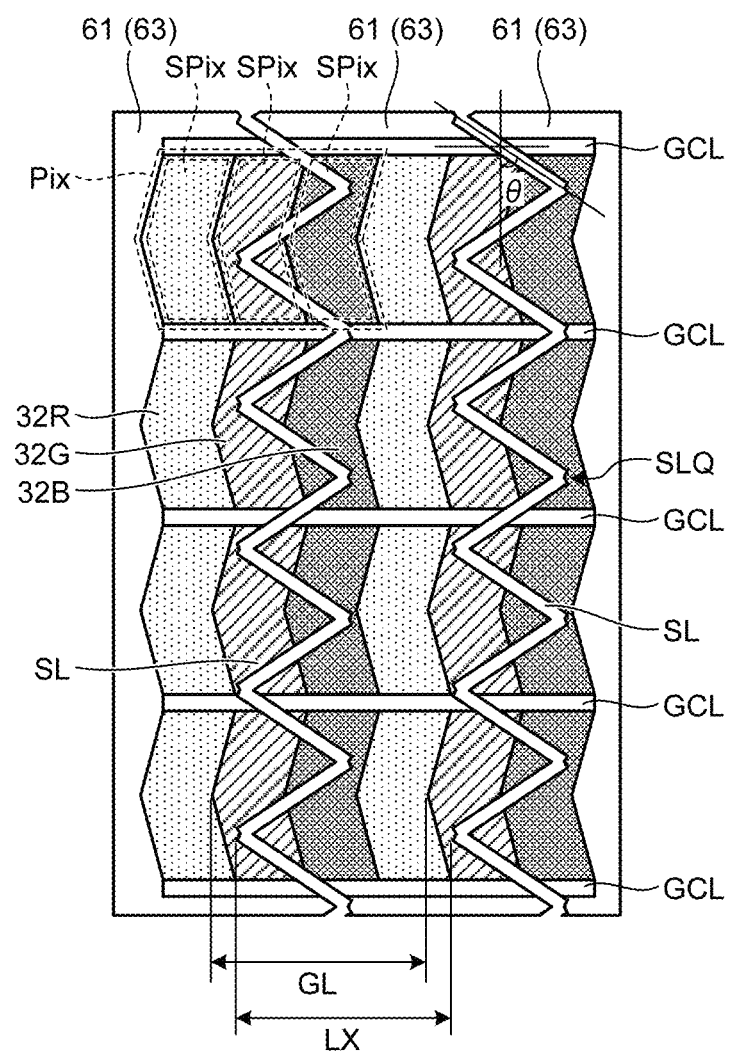
FIG. 20 is a schematic diagram for explaining a specific example of the relation between the arrangement of the touch detection electrodes and the color regions of the color filter illustrated in FIG. 19.

The display device 1 with a touch detection function according to a second embodiment is explained next. FIG. 19 is a schematic diagram for explaining a relation between an arrangement of touch detection electrodes and color regions of a color filter according to the second embodiment. FIG. 20 is a schematic diagram for explaining a specific example of the relation between the arrangement of the touch detection electrodes and the color regions of the color filter illustrated in FIG. 19. Same reference signs refer to similar constituent elements explained in the first embodiment, and redundant explanations thereof may not be repeated.

As illustrated in FIGS. 19 and 20, the color filter 32 includes color regions 32R, 32G, and 32B colored in three colors of red (R), green (G), and blue (B). Normally, the color regions 32R, 32G, and 32B respectively extend in the direction to intersect the extending direction of the scanning signal line GCL in grade separation and orthogonal thereto. Furthermore, the detection electrode patterns 61 of the touch detection electrodes TDL illustrated in FIG. 19 extend in the direction to intersect the extending direction of the scanning signal line GCL in grade separation and orthogonal thereto. The slit SL is a zigzag line, as illustrated in FIG. 19, in which a straight line having an angle θ with respect to a straight line orthogonal to the scanning signal line GCL is folded back at a bent part at a regular interval.

As described above, the color filter 32 is matched with the pixel Pix as one set, in which the color regions 32R, 32G, and 32B colored in three colors of red (R), green (G), and blue (B) are matched with each sub-pixel SPix. When it is assumed that the pitch of the pixel Pix (the pitch of one set of the sub-pixels SPix) in the extending direction of the scanning signal line GCL is the pixel pitch GL, and the pitch of the slit SL in the extending direction of the scanning signal line GCL is the slit pitch LX, the slit pitch LX is multiples of a natural number of the pixel pitch GL.

For example, in FIG. 19, the slit pitch LX is two times the pixel pitch GL. In FIG. 20, the slit pitch LX is one time the pixel pitch GL. As illustrated in FIG. 19, when it is assumed that a slit folding pitch of the slit SL that is folded back at a bent part is DL, the slit folding pitch DL is three times the pitch of the sub-pixel SPix in the extending direction of the scanning signal line GCL. The slit SL is folded back across four sub-pixels Spix.

As described above, the slits SL in the detection electrode patterns 61 of the touch detection electrodes TDL are arranged with an interval of multiples of a natural number (for example, two times) of the pitch of the pixel Pix of the pixel electrodes 22 arranged in a matrix. Similarly, the slits SL in the dummy patterns 63 and 64 are arranged with the interval of multiples of a natural number (for example, two times) of the pitch of the pixel Pix of the pixel electrodes 22 arranged in the matrix.

1-2A. Operational Effect

As in the slits SL according to the first embodiment, the slits SL according to the second embodiment are arranged with the interval of multiples of a natural number (for example, two times) of the pitch of the pixel Pix of the pixel electrodes 22 arranged in the matrix. It is possible to reduce the influence of the slits SL by increasing the slit pitch LX, as compared with a case where the slit SL is provided for each sub-pixel SPix. However, when the slit pitch LX is equal to or larger than 150 micrometers (μm), an invisibilizing effect deteriorates, and, for example, the touch detection electrodes TDL may be viewed. Therefore, the slit SL of the second embodiment is a zigzag line. The slit SL of the second embodiment overlaps a plurality of color regions so as to extend across the color regions as viewed in the vertical direction to the surface of the TFT substrate 21.

For example, as illustrated in FIG. 19, the slit SL overlaps the specific color regions 32B, 32R, and 32G as viewed in the vertical direction to the surface of the TFT substrate 21. Alternatively, as illustrated in FIG. 20, the slit SL overlaps the specific color regions 32B and 32G as viewed in the vertical direction to the surface of the TFT substrate 21. Therefore, in the display device 1 with a touch detection function according to the second embodiment, the slit SL does not cause a variation of a decrease of transmittance between pixels Pix. Accordingly, the slit SL according to the second embodiment can strengthen the invisibilizing effect, and even if the slit pitch LX is increased, visibility of the detection electrode patterns 61 and the dummy patterns 63 and 64 can be reduced.

Furthermore, the display device 1 with a touch detection function according to the second embodiment can reduce the influence of the slits SL as compared with the case where the slit SL is provided for each sub-pixel SPix. As a result, the display device 1 with a touch detection function according to the second embodiment can suppress the possibility of causing a difference in the optical wavelengths according to the presence or nonpresence of the transparent conductive body e. Therefore, the display device 1 with a touch detection function according to the second embodiment can suppress the possibility of shifting the color to be displayed originally by the liquid-crystal display unit 20. As a result, the display unit 10 with a touch detection function according to the second embodiment can decrease the possibility in which Moire fringes become visible according to the visual field angle.

1-2B. First Modification of Second Embodiment

Figure 21:
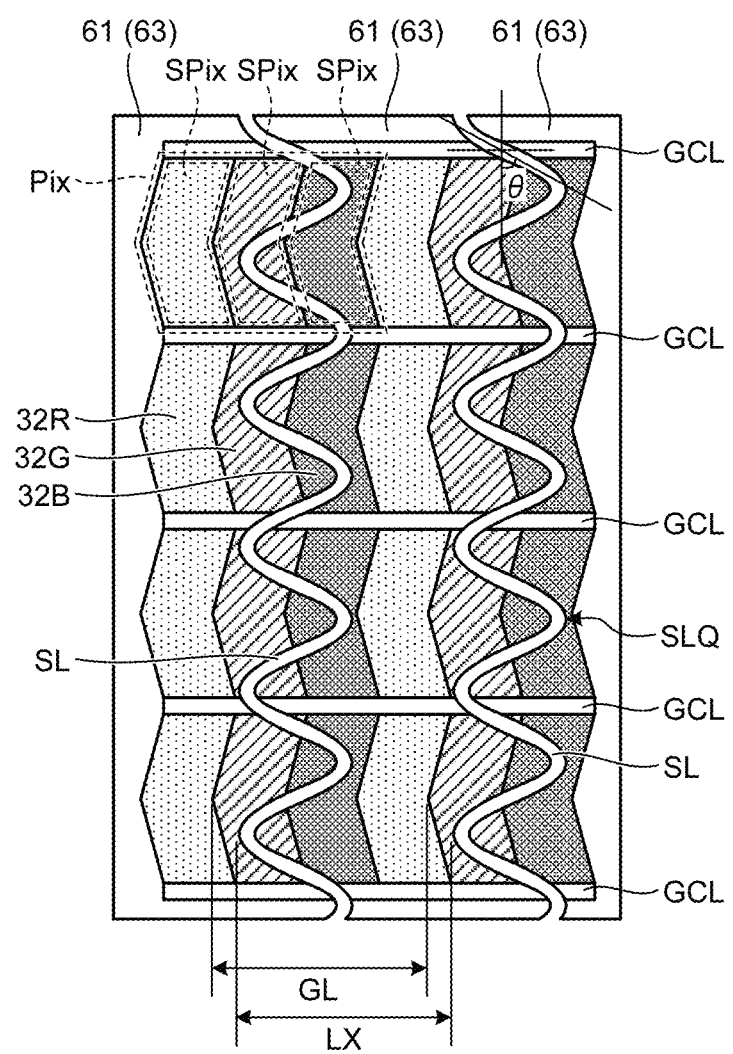
FIG. 21 is a schematic diagram for explaining a first modification of the relation between the arrangement of the touch detection electrodes and the color regions of the color filter illustrated in FIG. 19.

FIG. 21 is a schematic diagram for explaining a first modification of the relation between the arrangement of the touch detection electrodes and the color regions of the color filter illustrated in FIG. 19. As illustrated in FIG. 21, the slit SL according to the first modification of the second embodiment is a wavy line in which a straight line having an angle θ with respect to a straight line orthogonal to the scanning signal line GCL is folded back at a bent part SLQ at a regular interval. As compared with the zigzag line described above, the wavy line is a curved line with a corner of a bent part SLQ being rounded, thereby enabling to suppress an increase of resistance due to the influence of the bent part SLQ. The example explained in the second embodiment with the zigzag line of the slit SL can apply the wavy line as well.

1-2C. Second Modification of Second Embodiment

Figure 22:
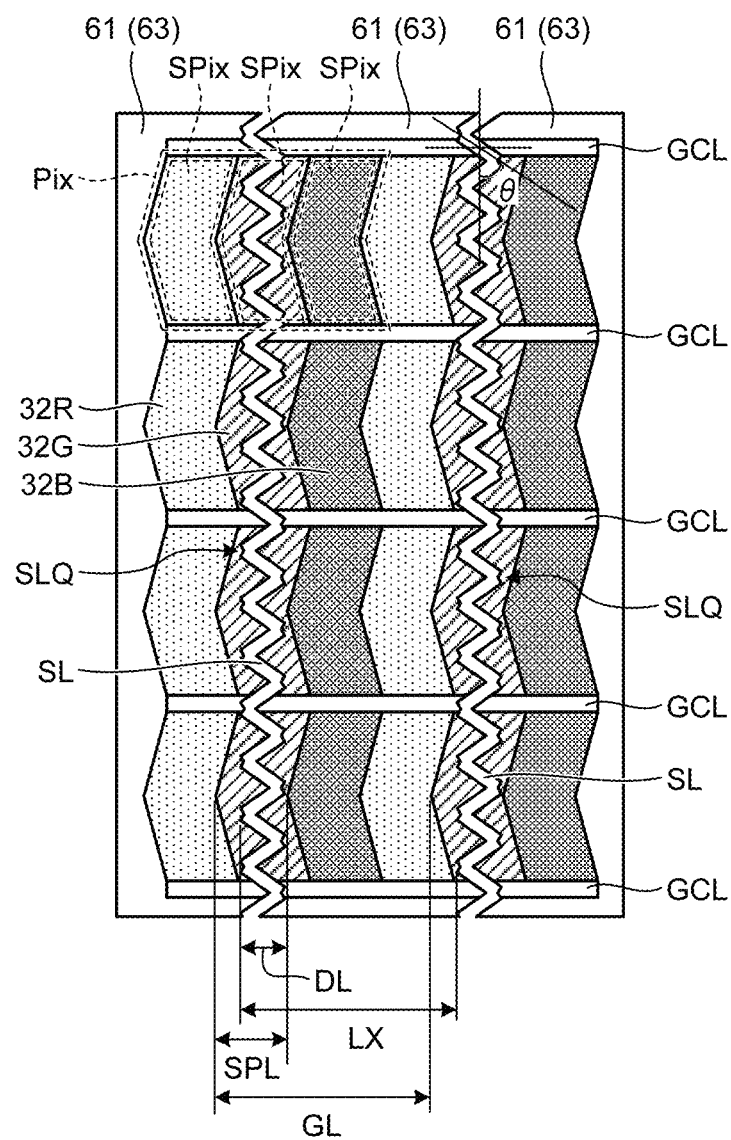
FIG. 22 is a schematic diagram for explaining a second modification of the relation between the arrangement of the touch detection electrodes and the color regions of the color filter according to illustrated in FIG. 19.

FIG. 22 is a schematic diagram for explaining a second modification of the relation between the arrangement of the touch detection electrodes and the color regions of the color filter illustrated in FIG. 19. As illustrated in FIG. 22, a slit pitch LX according to the second modification of the second embodiment is multiples of a natural number (for example, one time) of the pixel pitch GL. The slit SL according to the second modification of the second embodiment is a zigzag line. The slit SL according to the second modification of the second embodiment does not overlap a plurality of color regions to extend across the plurality of color regions as viewed in the vertical direction to the surface of the TFT substrate 21.

The slit folding pitch DL is equal to or smaller than a pitch SPL of the sub-pixel SPix in the extending direction of the scanning signal line GCL. The slit SL is folded back in the column of one sub-pixel SPix. The slit SL overlaps the regions of a specific color such as the color regions 32B as viewed in the vertical direction to the surface of the TFT substrate 21. For example, as illustrated in FIG. 22, the slit SL overlaps the specific color regions 32G as viewed in the vertical direction to the surface of the TFT substrate 21. Therefore, in the display device 1 with a touch detection function according to the second modification of the second embodiment, the slit SL does not cause a variation of a decrease of transmittance between pixels Pix. Furthermore, it is expected that the slit SL can strengthen the invisibilizing effect due to the effect of its zigzag line shape.

1-2D. Third Modification of Second Embodiment

Figure 23:
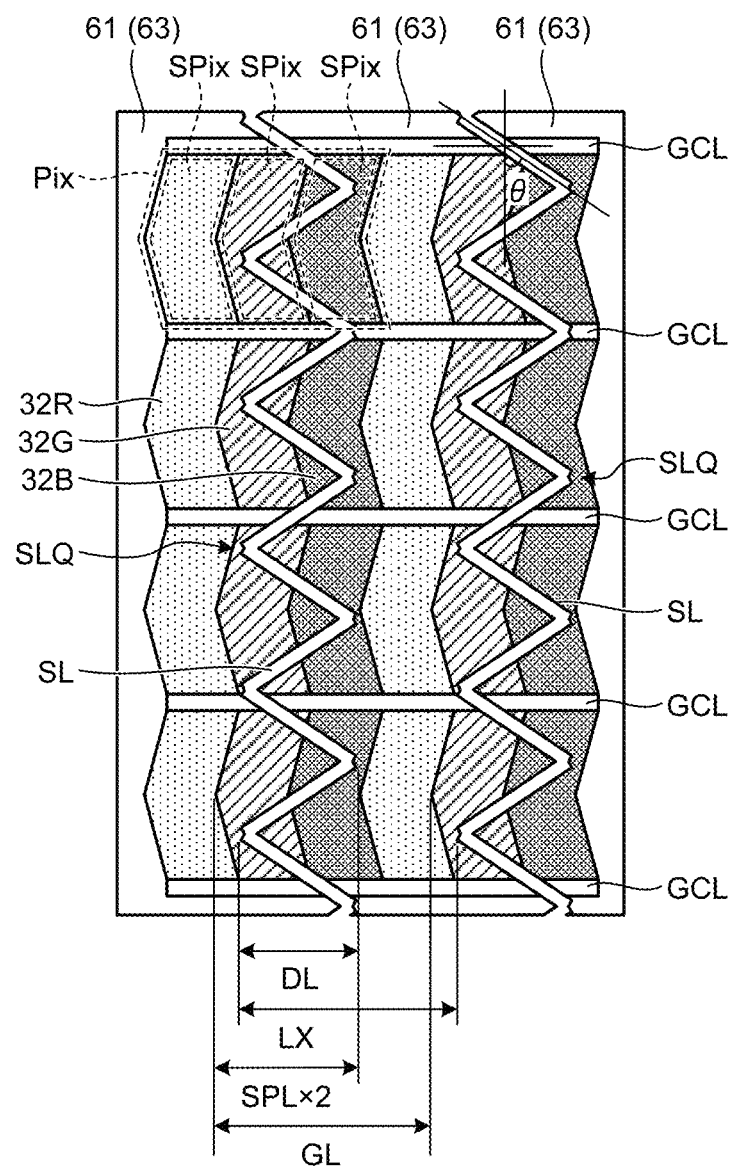
FIG. 23 is a schematic diagram for explaining a third modification of the relation between the arrangement of the touch detection electrodes and the color regions of the color filter according to illustrated in FIG. 19.

FIG. 23 is a schematic diagram for explaining a third modification of the relation between the arrangement of the touch detection electrodes and the color regions of the color filter illustrated in FIG. 19. As illustrated in FIG. 23, the slit pitch LX according to the third modification of the second embodiment is multiples of a natural number (for example, one time) of the pixel pitch GL. The slit SL according to the third modification of the second embodiment is a zigzag line. The slit SL according to the third modification of the second embodiment overlaps a plurality of color regions so as to extend across the plurality of color regions as viewed in the vertical direction to the surface of the TFT substrate 21.

The slit folding pitch DL is equal to or smaller than two times of the pitch SPL of the sub-pixel SPix in the extending direction of the scanning signal line GCL. The slit SL is folded back across two sub-pixels SPix.

For example, as illustrated in FIG. 23, the slit SL overlaps a plurality of color regions 32G and 32B as viewed in the vertical direction to the surface of the TFT substrate 21. Therefore, the display device 1 with a touch detection function according to the third modification of the second embodiment does not cause a variation of a decrease of transmittance between pixels Pix. Accordingly, the slit SL according to the third modification of the second embodiment can strengthen the invisibilizing effect, and even if the slit pitch LX is increased, visibility of the detection electrode patterns 61 and the dummy patterns 63 and 64 can be reduced.

Furthermore, the display device 1 with a touch detection function according to the third modification of the second embodiment can reduce the influence of the slit SL, as compared with the case where the slit SL is provided for each sub-pixel SPix. As a result, in the display device 1 with a touch detection function according to the third modification of the second embodiment, the possibility of causing a difference in the optical wavelengths due to the presence or nonpresence of the transparent conductive body e can be suppressed. Therefore, the display device 1 with a touch detection function according to the third modification of the second embodiment can suppress the possibility of shifting the color to be displayed originally by the liquid-crystal display unit 20. As a result, the display unit 10 with a touch detection function according to the third modification of the second embodiment can decrease the possibility in which Moire fringes become visible according to the visual field angle.

1-2E. Fourth Modification of Second Embodiment

Figure 24:
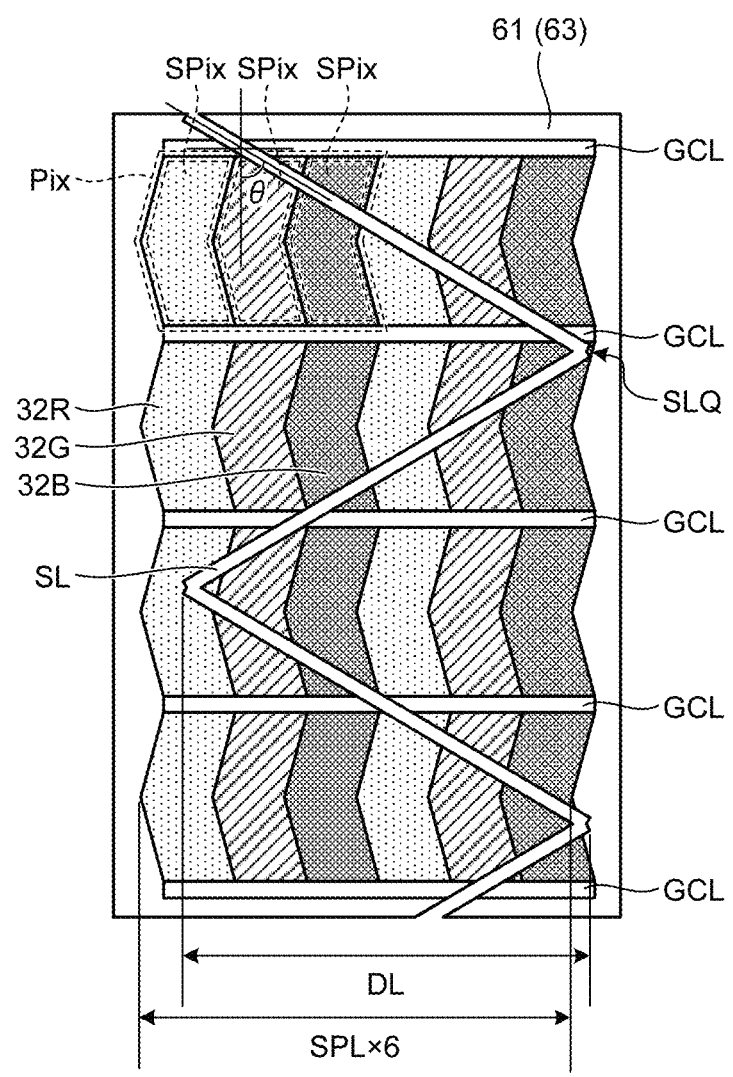
FIG. 24 is a schematic diagram for explaining a fourth modification of the relation between the arrangement of the touch detection electrodes and the color regions of the color filter according to illustrated in FIG. 19.

FIG. 24 is a schematic diagram for explaining a fourth modification of the relation between the arrangement of the touch detection electrodes and the color regions of the color filter illustrated in FIG. 19. Although not illustrated in FIG. 24, the slit pitch LX according to the fourth modification of the second embodiment is multiples of a natural number (for example, three times) of the pixel pitch GL, as in the second embodiment described above. The slit SL according to the fourth modification of the second embodiment is a zigzag line. The slit SL according to the fourth modification of the second embodiment overlaps a plurality of color regions so as to extend across the plurality of color regions as viewed in the vertical direction to the surface of the TFT substrate 21.

The slit folding pitch DL is equal to or smaller than six times the pitch SPL of the sub-pixel SPix in the extending direction of the scanning signal line GCL. The slit SL is folded back across six sub-pixels SPix.

For example, as illustrated in FIG. 24, the slit SL overlaps a plurality of color regions 32R, 32G, 32B, 32R, 32G, and 32B as viewed in the vertical direction to the surface of the TFT substrate 21. Therefore, the display device 1 with a touch detection function according to the fourth modification of the second embodiment does not cause a variation of a decrease of transmittance between pixels Pix. Accordingly, the slit SL according to the fourth modification of the second embodiment can strengthen the invisibilizing effect, and even if the slit pitch LX is increased, visibility of the detection electrode patterns 61 and the dummy patterns 63 and 64 can be reduced.

Furthermore, the display device 1 with a touch detection function according to the fourth modification of the second embodiment can reduce the influence of the slit SL, as compared with the case where the slit SL is provided for each sub-pixel SPix. As a result, in the display device 1 with a touch detection function according to the fourth modification of the second embodiment, the possibility of causing a difference in the optical wavelengths due to the presence or nonpresence of the transparent conductive body e can be suppressed. Therefore, the display device 1 with a touch detection function according to the fourth modification of the second embodiment can suppress the possibility of shifting the color to be displayed originally by the liquid-crystal display unit 20. As a result, the display unit 10 with a touch detection function according to the fourth modification of the second embodiment can decrease the possibility in which Moire fringes become visible according to the visual field angle.

1-2F. Fifth Modification of Second Embodiment

Figure 25:
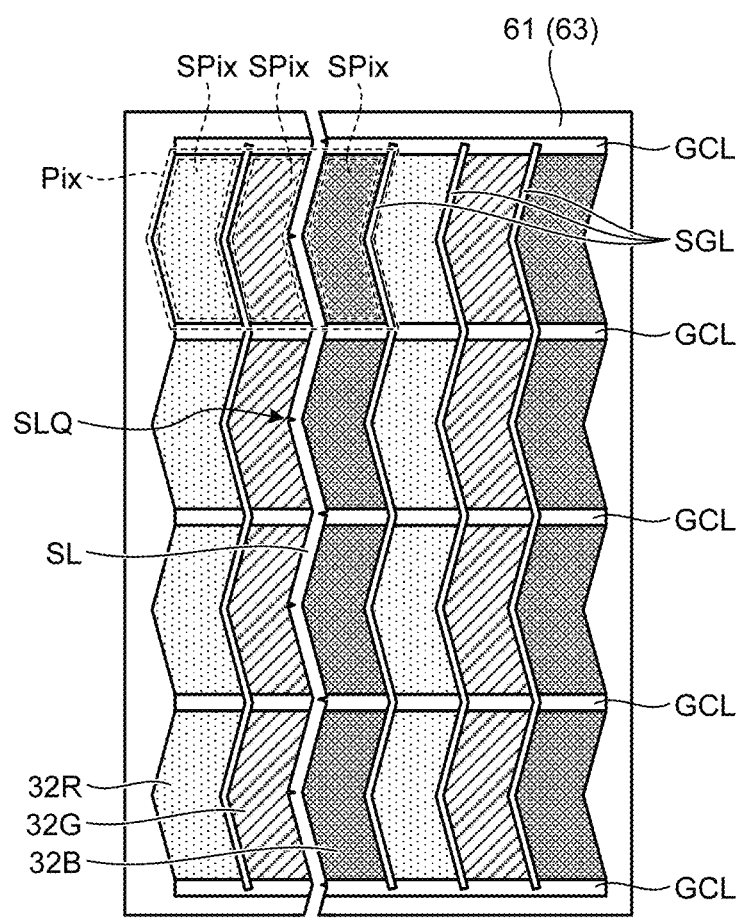
FIG. 25 is a schematic diagram for explaining a fifth modification of the relation between the arrangement of the touch detection electrodes and the color regions of the color filter according to illustrated in FIG. 19.

FIG. 25 is a schematic diagram for explaining a fifth modification of the relation between the arrangement of the touch detection electrodes and the color regions of the color filter illustrated in FIG. 19. Although not illustrated in FIG. 25, the slit pitch LX according to the fifth modification of the second embodiment is multiples of a natural number (for example, three times) of the pixel pitch GL, as in the second embodiment described above. The slit SL according to the fifth modification of the second embodiment is a zigzag line. The slit SL according to the fifth modification of the second embodiment overlaps the position of the pixel signal line SGL illustrated in FIG. 10, as viewed in the vertical direction to the surface of the TFT substrate 21. Therefore, light passing through the slit SL is dimmed by the scanning signal line GCL. As a result, scattering light that may be generated at the bent part SLQ of the slit SL is reduced. Accordingly, the slit SL according to the fifth modification of the second embodiment can strengthen the invisibilizing effect, and even if the slit pitch LX is increased, visibility of the detection electrode patterns 61 and the dummy patterns 63 and 64 can be reduced.

1-2G. Sixth Modification of Second Embodiment

Figure 26:
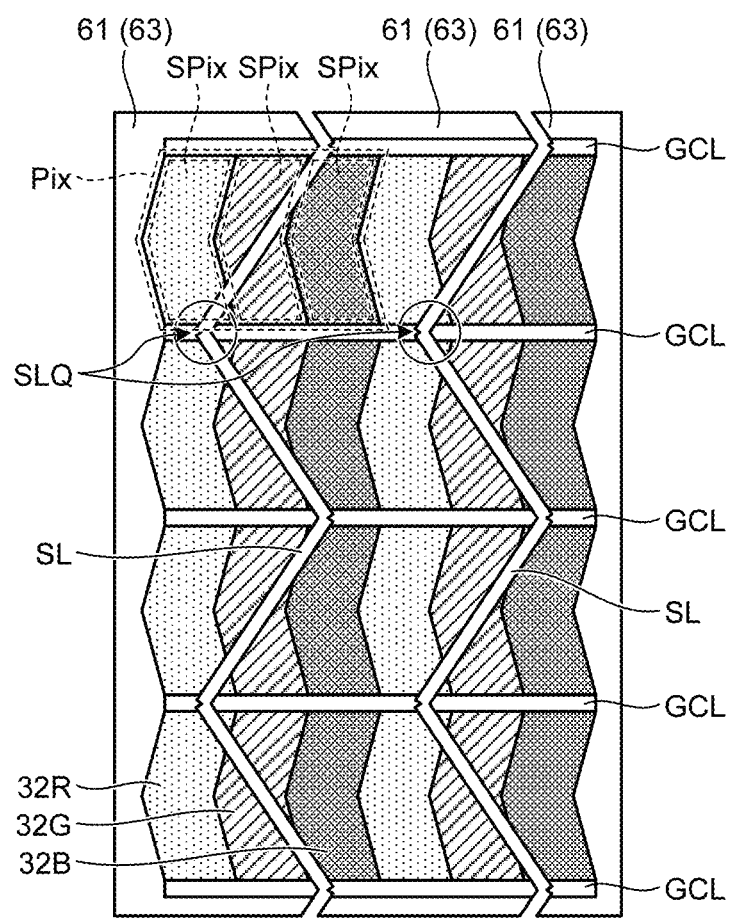
FIG. 26 is a schematic diagram for explaining a sixth modification of the relation between the arrangement of the touch detection electrodes and the color regions of the color filter according to illustrated in FIG. 19.

FIG. 26 is a schematic diagram for explaining a sixth modification the relation between the arrangement of the touch detection electrodes and the color regions of the color filter illustrated in FIG. 19. The slit pitch LX according to the sixth modification of the second embodiment is multiples of a natural number (for example, one time) of the pixel pitch. The slit SL according to the sixth modification of the second embodiment is a zigzag line.

The bent part SLQ of the slit SL according to the sixth modification of the second embodiment overlaps the position of the scanning signal line GCL illustrated in FIG. 10, as viewed in the vertical direction to the surface of the TFT substrate 21. Therefore, light passing through the slit SL is dimmed by the scanning signal line GCL. As a result, scattering light that may be generated at the bent part SLQ of the slit SL is reduced. Accordingly, the slit SL according to the sixth modification of the second embodiment can strengthen the invisibilizing effect, and even if the slit pitch LX is increased, visibility of the detection electrode patterns 61 and the dummy patterns 63 and 64 can be reduced.

The bent part SLQ of the slit SL according to the sixth modification of the second embodiment overlaps entirely on the position of the scanning signal line GCL illustrated in FIG. 10, as viewed in the vertical direction to the surface of the TFT substrate 21. The bent part SLQ of the slit SL can partly overlap the position of the scanning signal line GCL as viewed in the vertical direction to the surface of the TFT substrate 21. In this case, the effect can be increased by the amount in which the bent part SLQ and the scanning signal line GCL overlap each other.

1-2H. Seventh Modification of Second Embodiment

Figure 27:
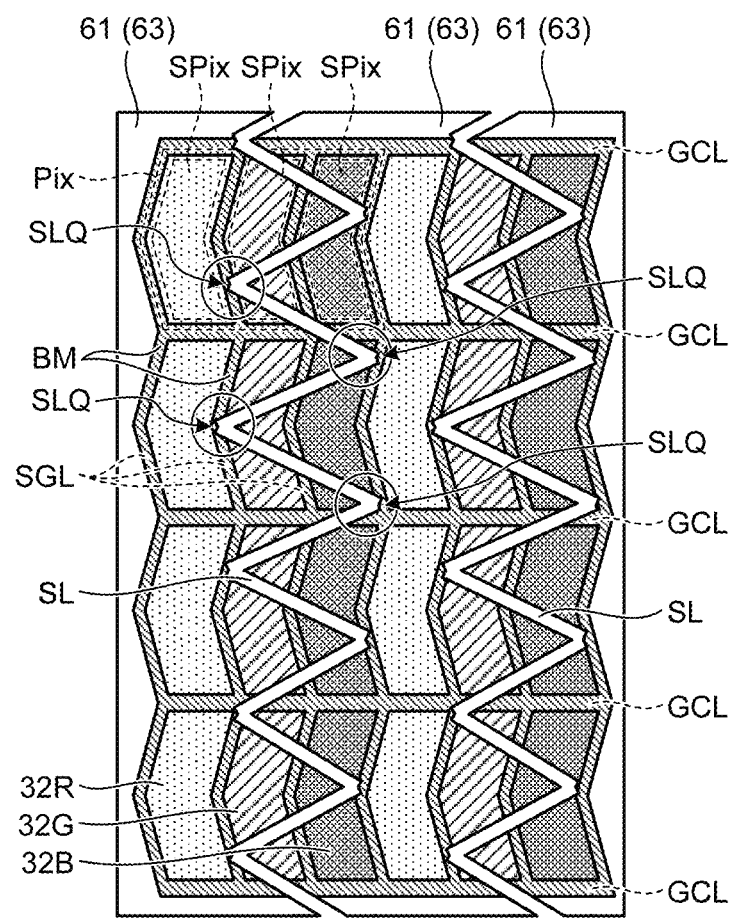
FIG. 27 is a schematic diagram for explaining a seventh modification of the relation between the arrangement of the touch detection electrodes and the color regions of the color filter according to illustrated in FIG. 19.

FIG. 27 is a schematic diagram for explaining a seventh modification of the relation between the arrangement of the touch detection electrodes and the color regions of the color filter illustrated in FIG. 19. The slit pitch according to the seventh modification of the second embodiment is multiples of a natural number (for example, one time) of the pixel pitch. The slit SL according to the seventh modification of the second embodiment is a zigzag line.

As illustrated in FIG. 27, a light shielding layer BM, which has a light shielding function and is also referred to as "black matrix", is arranged at the edge of the sub-pixel SPix in the same layer as the color filter 32. The bent part SLQ of the slit SL according to the seventh modification of the second embodiment overlaps the position of the light shielding layer BM as viewed in the vertical direction to the surface of the TFT substrate 21. Therefore, light passing through the slit SL is dimmed by the light shielding layer BM. As a result, scattering light that may be generated at the bent part SLQ of the slit SL is reduced. Accordingly, the slit SL according to the seventh modification of the second embodiment can strengthen the invisibilizing effect, and even if the slit pitch LX is increased, visibility of the detection electrode patterns 61 and the dummy patterns 63 and 64 can be reduced.

1-2I. Eighth Modification of Second Embodiment

Figure 28:
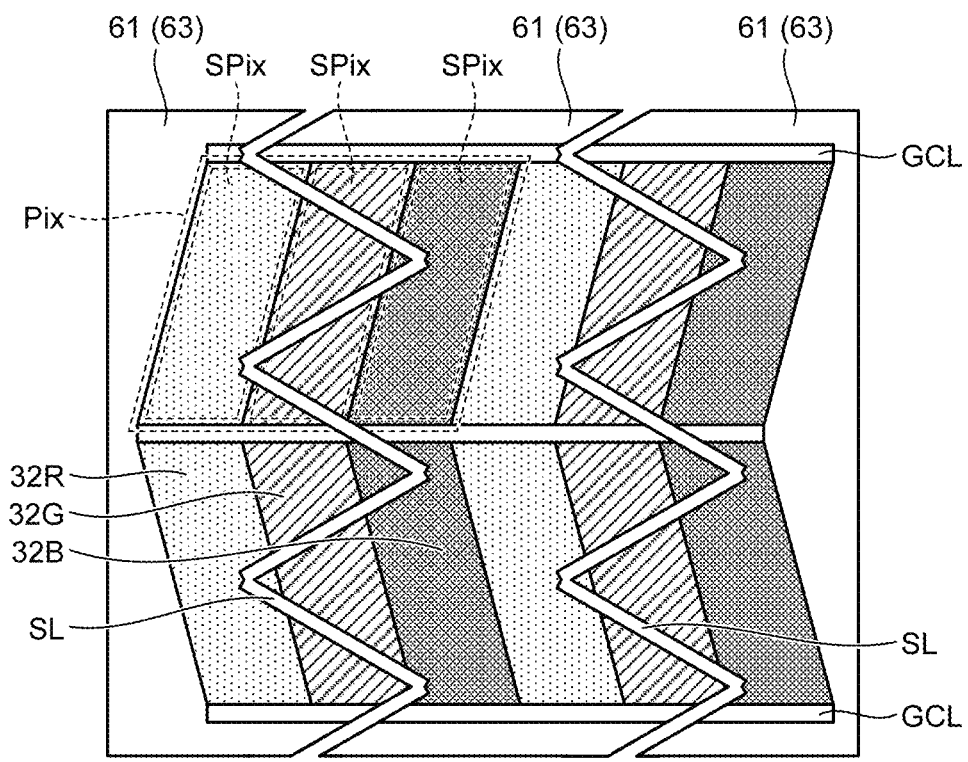
FIG. 28 is a schematic diagram for explaining an eighth modification of the relation between the arrangement of the touch detection electrodes and the color regions of the color filter according to illustrated in FIG. 19.

FIG. 28 is a schematic diagram for explaining an eighth modification of the relation between the arrangement of the touch detection electrodes and the color regions of the color filter illustrated in FIG. 19. The slit pitch according to the eighth modification of the second embodiment is multiples of a natural number (for example, one time) of the pixel pitch. The slit SL according to the eighth modification of the second embodiment is a zigzag line. The sub-pixels SPix illustrated in the second embodiment and the first to seventh modifications of the second embodiment have a shape referred to as "dual domain pixel". The shape of the sub-pixels SPix is not limited thereto, and can have a shape illustrated in FIG. 28, which is referred to as "pseudo dual domain pixel".

1-2J. Ninth Modification of Second Embodiment

Figure 29:
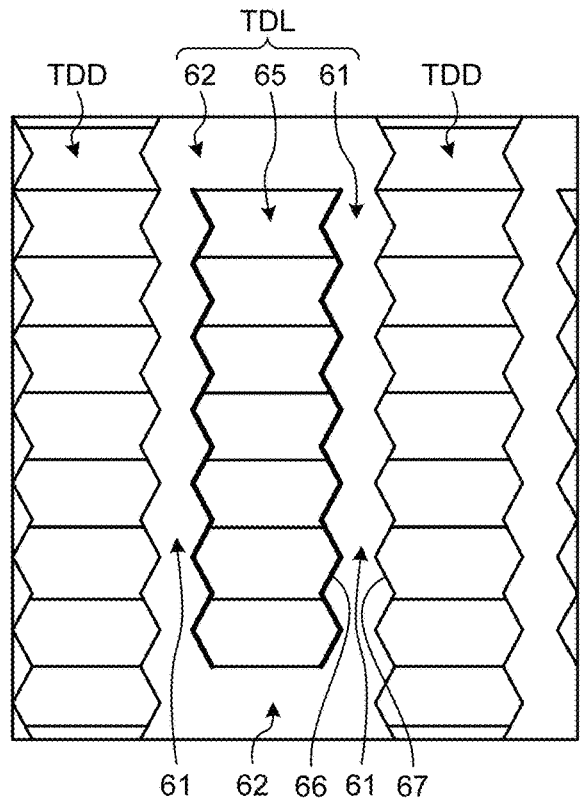
FIG. 29 is a schematic diagram illustrating the arrangement of the touch detection electrodes according to a ninth modification of the second embodiment.
Figure 30:
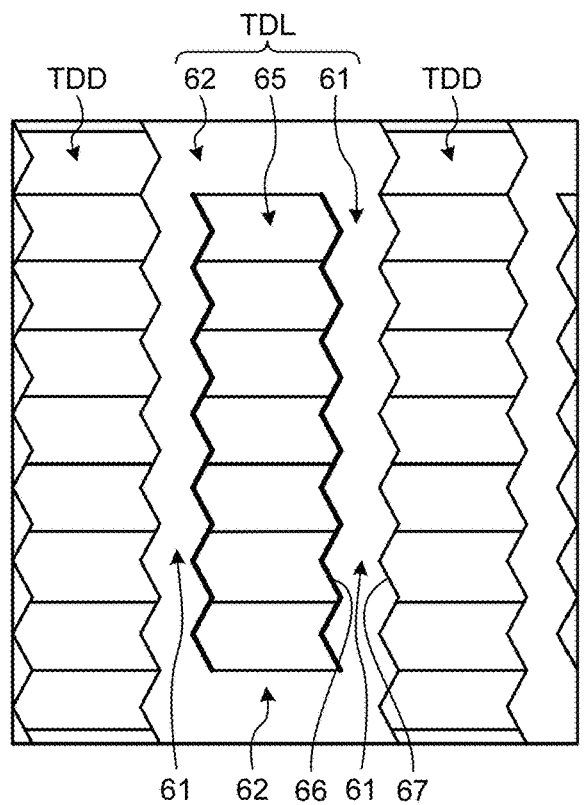
FIG. 30 is another schematic diagram illustrating the arrangement of the touch detection electrodes according the ninth modification of to the second embodiment.

FIGS. 29 and 30 are schematic diagrams illustrating the arrangement of the touch detection electrodes according to a ninth modification of the second embodiment. As described above, the touch detection electrode TDL includes the detection electrode patterns 61 and the detection-electrodes conductive portions 62 that conduct between the detection electrode patterns 61. The detection electrode patterns 61 and the detection-electrodes conductive portions 62 surround the periphery of the non-detection area 65. Although illustration of the slit SL is omitted in FIGS. 29 and 30, because the slit SL is the zigzag line, the shape of a boundary line 66 on the side of the non-detection area 65 and the shape of a boundary line 67 on the side of the dummy electrode TDD of the detection electrode pattern 61 also become zigzag.

The electrode pattern 61 illustrated in FIG. 29 is line-symmetric in which the boundary line 66 and the boundary line 67 of the electrode pattern 61 are folded back in the extending direction of the electrode pattern 61 (the direction orthogonal to the extending direction of the scanning signal line GCL described above). In the detection electrode pattern 61 illustrated in FIG. 30, there is a part in which the boundary line 66 and the boundary line 67 of the electrode pattern 61 are parallel to each other. Therefore, the width of the portion between the boundary line 66 and the boundary line 67 in the direction orthogonal to the extending direction of the electrode pattern 61 (the direction orthogonal to the extending direction of the scanning signal line GCL described above) becomes substantially constant. The detection electrode pattern 61 illustrated in FIG. 30 can reduce a partial electric loss as compared with the detection electrode pattern 61 illustrated in FIG. 29, and can reduce a variation of a resistance characteristic within the surface of the touch detection device 30.

1-3. Third Embodiment

Figure 31:
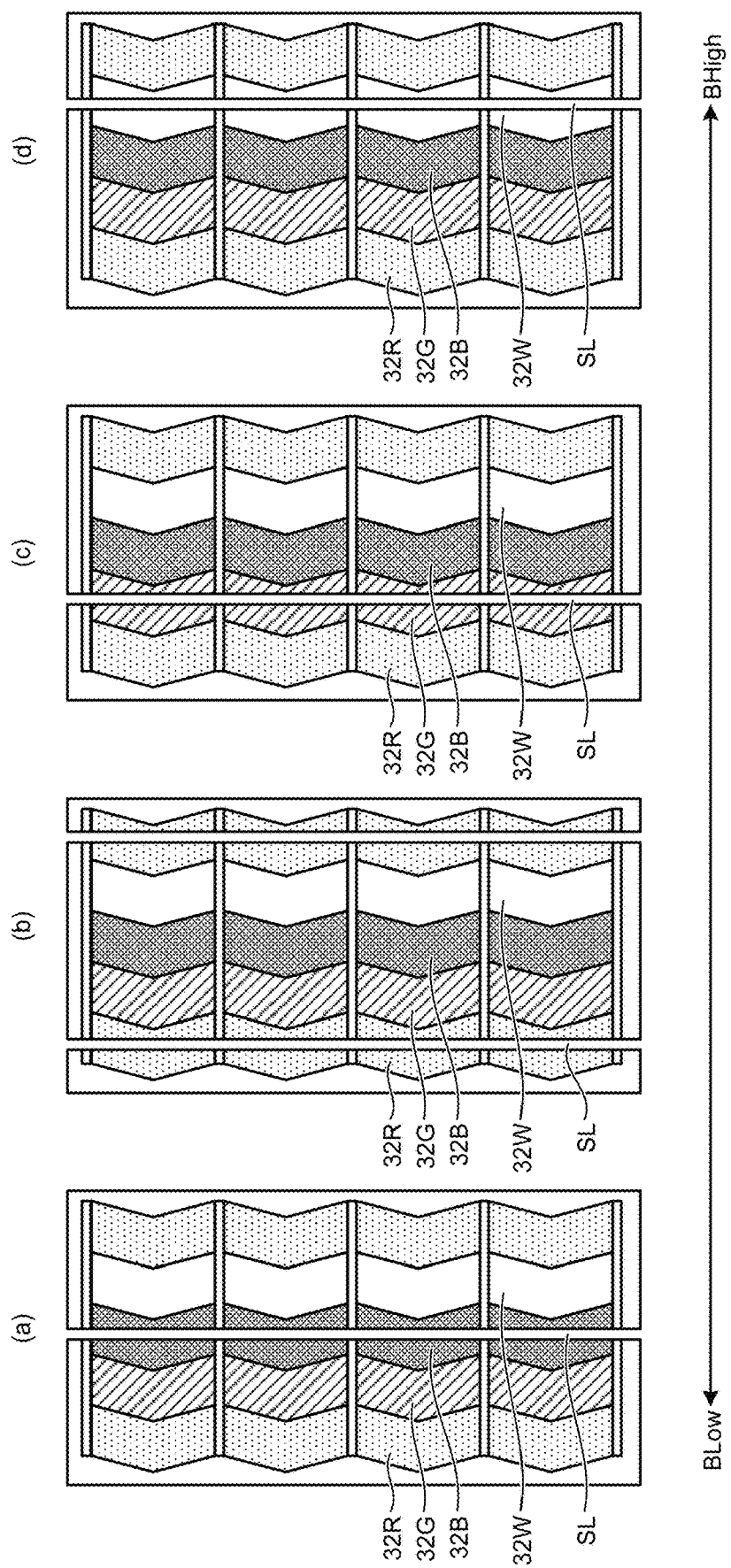
FIG. 31 is a schematic diagram for explaining a change in luminance corresponding to an arrangement of touch detection electrodes according to a third embodiment.

The display device 1 with a touch detection function according to a third embodiment is explained next. FIG. 31 is a schematic diagram for explaining a change in luminance corresponding to an arrangement of touch detection electrodes according to the third embodiment. FIGS. 32 to 36 are schematic diagrams for explaining a relation between an arrangement of the touch detection electrodes and color regions of a color filter according to the third embodiment. Same reference signs refer to similar constituent elements explained in the first and second embodiments, and redundant explanations thereof may not be repeated.

The color filter 32 includes color regions 32R, 32G, 32B, and 32W colored in four colors of red (R), green (G), blue (B), and white (W). The color filter 32 is matched with the pixel Pix as one set, in which the color regions 32R, 32G, 32B, and 32W colored in four colors of red (R), green (G), blue (B), and white (W) are matched with each sub-pixel SPix by cyclically arranging color filters colored in, for example, four colors of red (R), green (G), blue (B), and white (W).

A pattern (a) illustrated in FIG. 31 represents a state where the slit SL described in the first embodiment overlaps the color region 32B of blue (B), of the color regions 32R, 32G, 32B, and 32W colored in four colors of red (R), green (G), blue (B), and white (W).

A pattern (b) illustrated in FIG. 31 represents a state where the slit SL described in the first embodiment overlaps the color region 32R of red (R), of the color regions 32R, 32G, 32B, and 32W colored in four colors of red (R), green (G), blue (B), and white (W).

A pattern (c) illustrated in FIG. 31 represents a state where the slit SL described in the first embodiment overlaps the color region 32G of green (G), of the color regions 32R, 32G, 32B, and 32W colored in four colors of red (R), green (G), blue (B), and white (W).

A pattern (d) illustrated in FIG. 31 represents a state where the slit SL described in the first embodiment overlaps the color region 32W of white (W), of the color regions 32R, 32G, 32B, and 32W colored in four colors of red (R), green (G), blue (B), and white (W).

Figure 32:
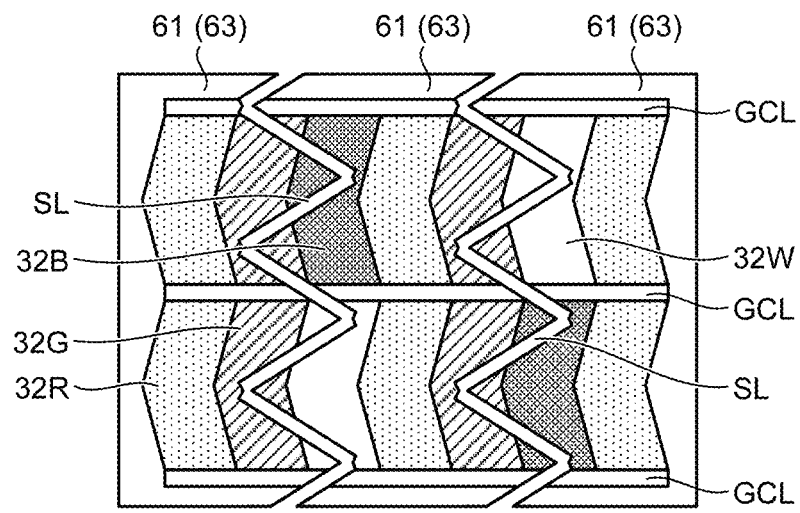
FIG. 32 is a schematic diagram for explaining a relation between an arrangement of the touch detection electrodes and color regions of a color filter according to the third embodiment.

The patterns (a), (b), (d), and (d) illustrated in FIG. 31 can be arranged in order of from Blow having a low luminance to BHigh having a high luminance. Therefore, the color regions 32R and 32G illustrated in FIG. 32 are extended in the direction orthogonal to the extending direction of the scanning signal line GCL, and the color regions 32B and 32W are arranged alternately every time the scanning signal line GCL is exceeded. The slit SL is a zigzag line that is folded back within a pitch of two sub-pixels SPix in the extending direction of the scanning signal line GCL, and is arranged at a slit pitch of multiples of a natural number (for example, one time) of the pixel pitch.

Figure 33:
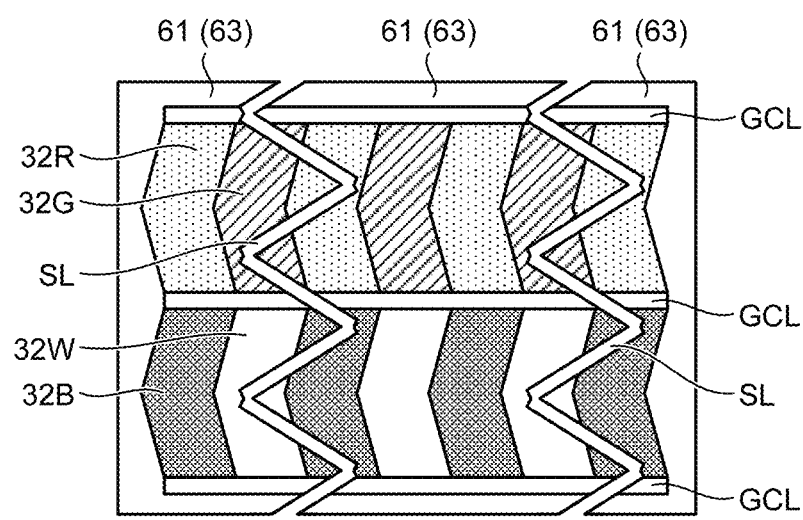
FIG. 33 is another schematic diagram for explaining the relation between the arrangement of the touch detection electrodes and the color regions of the color filter according to the third embodiment.

The color regions 32R and 32B illustrated in FIG. 33 are arranged alternately every time the scanning signal line GCL is exceeded in the direction orthogonal to the extending direction of the scanning signal line GCL. The color regions 32G and 32W are arranged alternately every time the scanning signal line GCL is exceeded. The slit SL is a zigzag line that is folded back within a pitch of two sub-pixels SPix in the extending direction of the scanning signal line GCL, and is arranged at a slit pitch of multiples of a natural number (for example, two times) of the pixel pitch.

Figure 34:
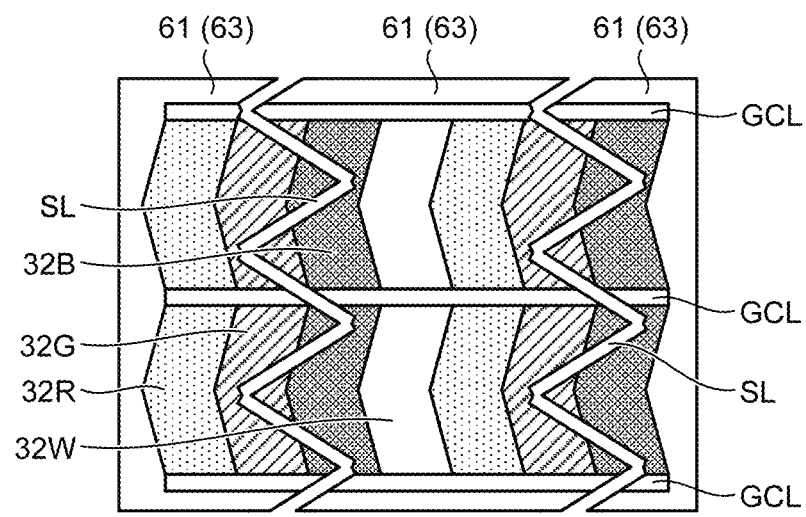
FIG. 34 is another schematic diagram for explaining the relation between the arrangement of the touch detection electrodes and the color regions of the color filter according to the third embodiment.

The color regions 32R, 32G, 32B, and 32W illustrated in FIG. 34 are extended in the direction orthogonal to the extending direction of the scanning signal line GCL. The slit SL is a zigzag line that is folded back within a pitch of two sub-pixels SPix in the extending direction of the scanning signal line GCL, and is arranged at a slit pitch of multiples of a natural number (for example, one time) of the pixel pitch.

Figure 35:
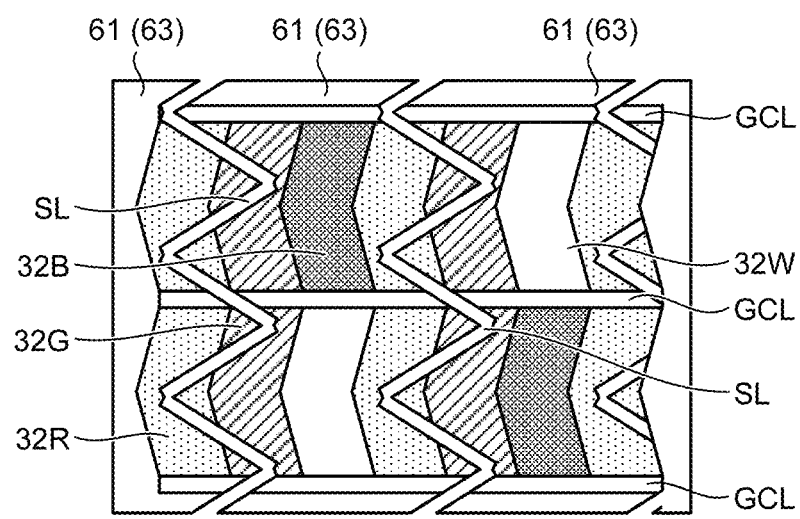
FIG. 35 is another schematic diagram for explaining the relation between the arrangement of the touch detection electrodes and the color regions of the color filter according to the third embodiment.

The color regions 32R and 32G illustrated in FIG. 35 are extended in the direction orthogonal to the extending direction of the scanning signal line GCL, and the color regions 32B and 32W are arranged alternately every time the scanning signal line GCL is exceeded. The slit SL is a zigzag line that is folded back within a pitch of two sub-pixels SPix in the extending direction of the scanning signal line GCL, and is arranged at a slit pitch of multiples of a natural number (for example, one time) of the pixel pitch. The slit SL can avoid overlapping the white (W) color region 32W having the largest influence. With this arrangement, the possibility of weakening the invisibilizing effect because the luminance is high and the influence of the slit SL is increased as the pattern (d) illustrated in FIG. 31 can be reduced.

Figure 36:
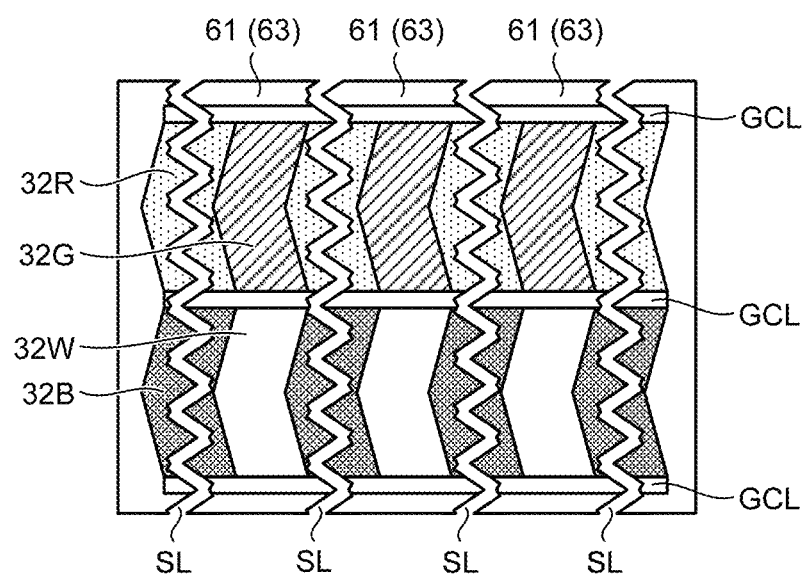
FIG. 36 is another schematic diagram for explaining the relation between the arrangement of the touch detection electrodes and the color regions of the color filter according to the third embodiment.

The color regions 32R and 32B illustrated in FIG. 36 are arranged alternately every time the scanning signal line GCL is exceeded in the direction orthogonal to the extending direction of the scanning signal line GCL, and the color regions 32G and 32W are arranged alternately every time the scanning signal line GCL is exceeded. The slit SL is a zigzag line that is folded back within a pitch of one sub-pixel SPix in the extending direction of the scanning signal line GCL, and is arranged at a slit pitch of multiples of a natural number (for example, one time) of the pixel pitch. The slit SL can avoid overlapping the white (W) color region 32W having the largest influence. With this arrangement, the possibility of weakening the invisibilizing effect because the luminance is high and the influence of the slit SL is increased as the pattern (d) illustrated in FIG. 31 can be reduced.

1-4. Modifications

While embodiments of the present disclosure have been explained above as describing several illustrative embodiments and modifications, the present disclosure is not limited to these embodiments and the like, and various modifications can be made.

In the embodiments described above, as described in the first embodiment, the drive electrode COML is driven and scanned one by one. However, the present disclosure is not limited thereto, and instead of this example, for instance, a predetermined number of drive electrodes COML can be driven and scanned by shifting the drive electrodes COML one by one.

In the display device 1 with a touch detection function according to the respective embodiments and modifications described above, the liquid-crystal display unit 20 using liquid crystals of various horizontal electric-field modes such as FFS mode or IPS mode and the touch detection device 30 can be integrated to form the display unit 10 with a touch detection function. Alternatively, the display unit 10 with a touch detection function can be formed by integrating liquid crystals of various vertical electric-field modes such as TN (Twisted Nematic) mode, VA (Vertical Alignment) mode, or ECB (Electrically Controlled Birefringence) mode and the touch detection device.

For example, the display device 1 with a touch detection function can use a vertical electric-field mode liquid crystal. Furthermore, in the respective embodiments described above, a so-called "in-cell" type in which the liquid-crystal display unit 20 and the capacitive type touch detection device 30 are integrated is used. However, the present disclosure is not limited thereto, and instead of this example, for instance, the display device 1 with a touch detection function can be an apparatus in which the capacitive type touch detection device is mounted on the liquid-crystal display unit. Also in this case, by having the configuration described above, touch detection can be performed with Moire fringes reduced.

2. APPLICATION EXAMPLE

Next, with reference to FIGS. 37 to 48, application examples of the display device 1 with a touch detection function explained in the above embodiments and modifications are explained. FIGS. 37 to 48 illustrate examples of an electronic apparatus to which the display device with a touch detection function according to the above embodiments is applied. It is possible to apply the display device 1 with a touch detection function according to the first, second, and third embodiments and modifications to electronic apparatuses in any field, including a television device, a digital camera, a laptop personal computer, a portable terminal device such as a portable phone, a video camera, and the like. In other words, it is possible to apply the display device 1 with a touch detection function according to the first, second, and third embodiments and modifications to electronic apparatuses in any field, which display a video signal input externally or a video signal generated internally as an image or a video.

Application Example 1

Figure 37:
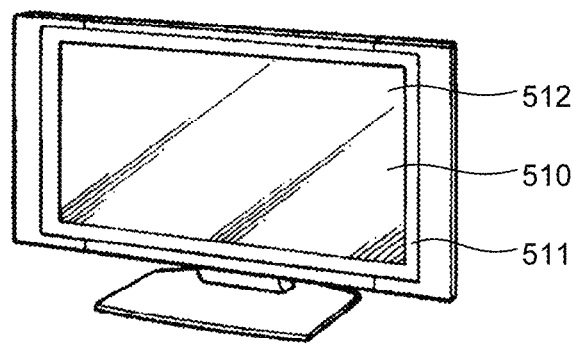
FIG. 37 illustrates an example of an electronic apparatus to which the display device with a touch detection function according to the embodiment is applied.

An electronic apparatus illustrated in FIG. 37 is a television device to which the display device 1 with a touch detection function according to the first, second, and third embodiments and modifications is applied. This television device includes a video display screen unit 510 that includes a front panel 511 and a filter glass 512, for example. The video display screen unit 510 is the display device with a touch detection function according to the first, second, and third embodiments and modifications.

Application Example 2

Figure 38:
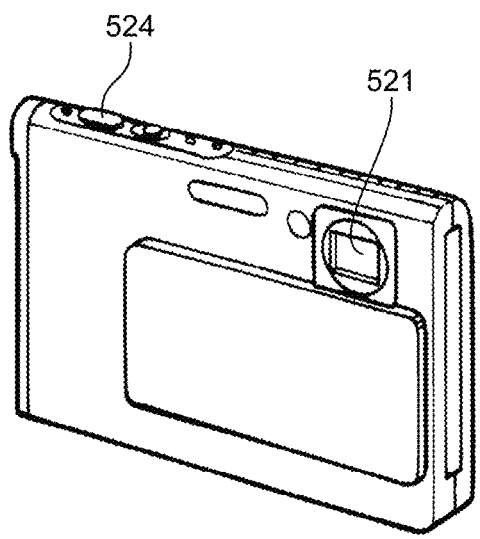
FIG. 38 illustrates another example of an electronic apparatus to which the display device with a touch detection function according to the embodiment is applied.
Figure 39:
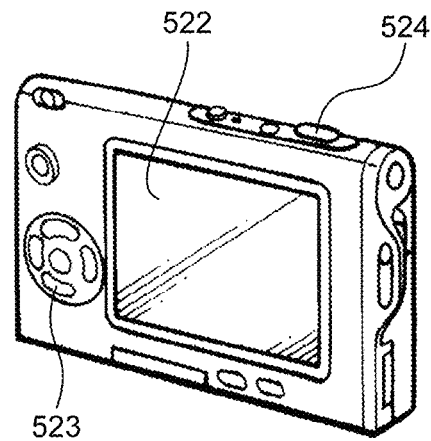
FIG. 39 illustrates another example of an electronic apparatus to which the display device with a touch detection function according to the embodiment is applied.

An electronic apparatus illustrated in FIGS. 38 and 39 is a digital camera to which the display device 1 with a touch detection function according to the first, second, and third embodiments and modifications is applied. This digital camera includes a flash-light producing unit 521, a display unit 522, a menu switch 523, and a shutter button 524, for example. The display unit 522 is the display device with a touch detection function according to the first, second, and third embodiments and modifications.

Application Example 3

Figure 40:
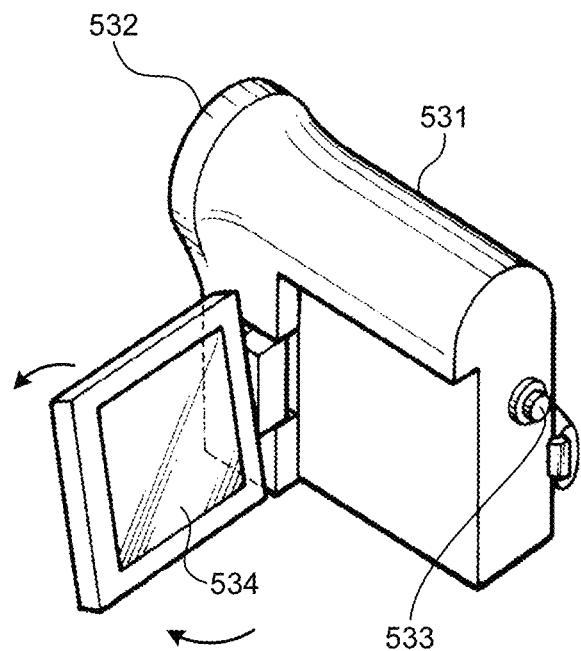
FIG. 40 illustrates another example of an electronic apparatus to which the display device with a touch detection function according to the embodiment is applied.

An electronic apparatus illustrated in FIG. 40 is a video camera to which the display device 1 with a touch detection function according to the first, second, and third embodiments and modifications is applied, and FIG. 40 illustrates its external appearance. This video camera includes a main unit 531, a subject capturing lens 532 that is provided on the front side of the main unit 531, an image-capturing start/stop switch 533, and a display unit 534, for example. The display unit 534 is the display device with a touch detection function according to the first, second, and third embodiments and modifications.

Application Example 4

Figure 41:
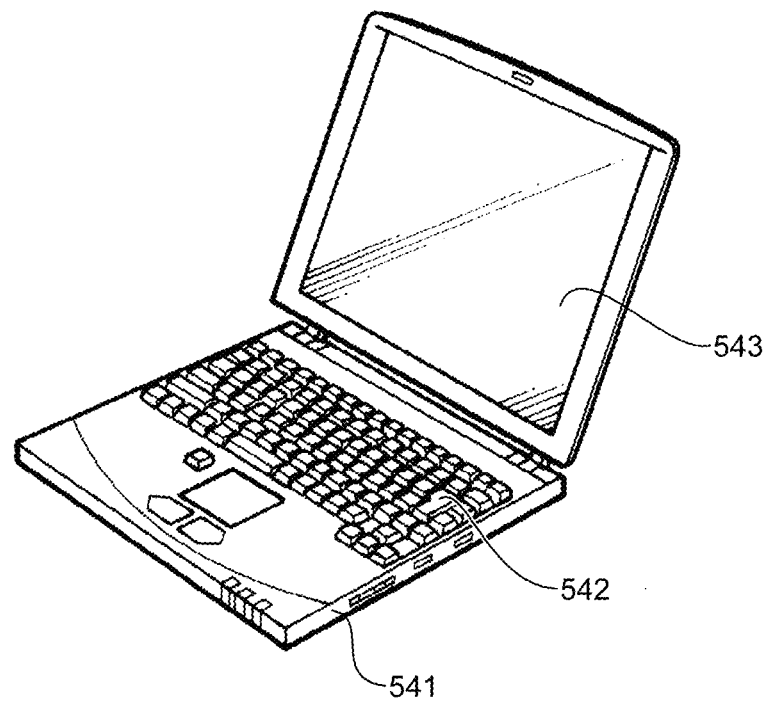
FIG. 41 illustrates another example of an electronic apparatus to which the display device with a touch detection function according to the embodiment is applied.
Figure 42:
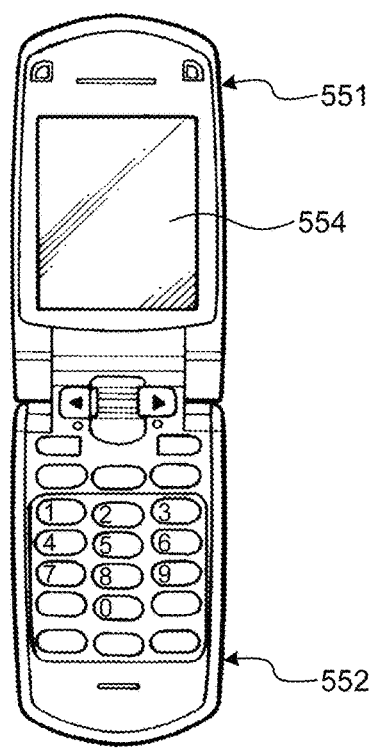
FIG. 42 illustrates another example of an electronic apparatus to which the display device with a touch detection function according to the embodiment is applied.
Figure 43:
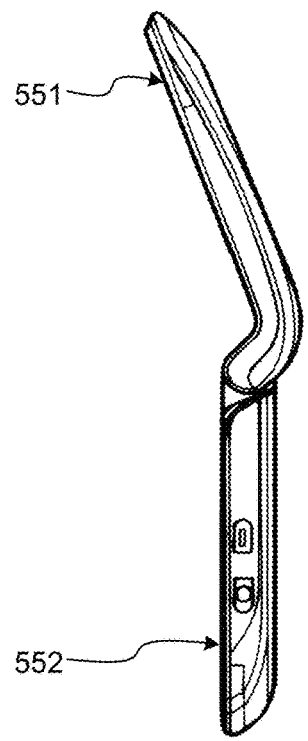
FIG. 43 illustrates another example of an electronic apparatus to which the display device with a touch detection function according to the embodiment is applied.
Figure 44:
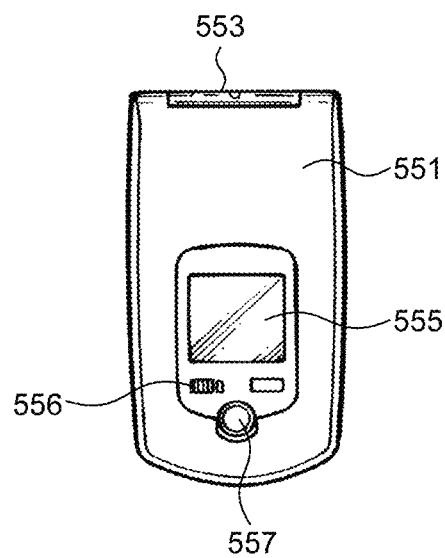
FIG. 44 illustrates another example of an electronic apparatus to which the display device with a touch detection function according to the embodiment is applied.
Figure 45:
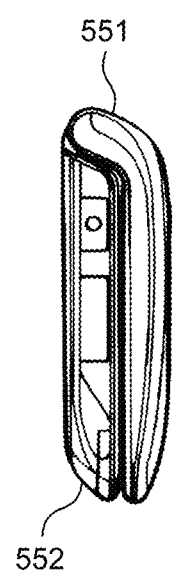
FIG. 45 illustrates another example of an electronic apparatus to which the display device with a touch detection function according to the embodiment is applied.
Figure 46:
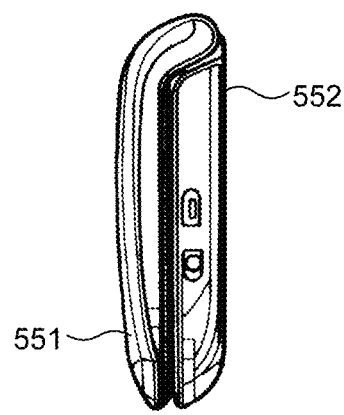
FIG. 46 illustrates another example of an electronic apparatus to which the display device with a touch detection function according to the embodiment is applied.
Figure 47:
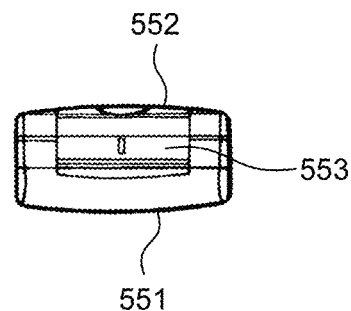
FIG. 47 illustrates another example of an electronic apparatus to which the display device with a touch detection function according to the embodiment is applied.
Figure 48:
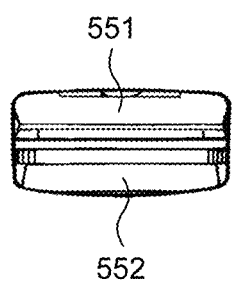
FIG. 48 illustrates another example of an electronic apparatus to which the display device with a touch detection function according to the embodiment is applied.

An electronic apparatus illustrated in FIG. 41 is a laptop personal computer to which the display device 1 with a touch detection function according to the first, second, and third embodiments and modifications is applied. This laptop personal computer includes a main unit 541, a keyboard 542 for an operation to input text and the like, and a display unit 543 that displays an image. The display unit 543 is the display device with a touch detection function according to the first, second, and third embodiments and modifications.

Application Example 5

An electronic apparatus illustrated in FIGS. 42 to 48 is a portable phone to which the display device 1 with a touch detection function according to the first, second, and third embodiments and modifications is applied. This portable phone is configured by coupling an upper casing 551 and a lower casing 552 by a coupling unit (a hinge) 553, and includes a display 554, a sub-display 555, a picture light 556, and a camera 557. The display 554 or the sub-display 555 is the display device with a touch detection function according to the first, second, and third embodiments and modifications.

3. ASPECTS OF THE PRESENT DISCLOSURE

The present disclosure includes aspects as follows.

(1) A display device with a touch detection function comprising:
a substrate;
a plurality of pixel electrodes arranged in a matrix on a plane parallel to a surface of the substrate;
a plurality of scanning signal lines extending on a plane parallel to the surface of the substrate to supply a scanning signal for driving the pixel electrodes;
a display functional layer that provides an image display function based on an image signal;
a drive electrode that faces the pixel electrodes in a vertical direction to the surface of the substrate and extends in a direction parallel to an extending direction of the scanning signal lines; and
a plurality of touch detection electrodes including a detection electrode pattern of a transparent conductive body that faces the drive electrode in the vertical direction and extends in a direction different from the extending direction of the scanning signal lines, wherein
the detection electrode pattern includes one or more slits each of which is a region where the transparent conductive body is not present,
the slits of the detection electrode pattern of the touch detection electrodes extend in a direction different from the extending direction of the scanning signal lines with a slit pitch having a predetermined interval therebetween in the extending direction of the scanning signal lines, and
the slit pitch is multiples of a natural number of a predetermined pixel pitch in which the pixel electrodes are arranged.

(2) The display device with a touch detection function according to (1), wherein
the touch detection electrode includes the detection electrode pattern and a dummy pattern that does not function as an electrode,
the dummy pattern includes one or more slits each of which is a region where the transparent conductive body is not present,
the slits of the dummy pattern of the touch detection electrodes extend in a direction different from the extending direction of the scanning signal lines with a slit pitch having a predetermined interval in the extending direction of the scanning signal lines, and
the slit pitch of the detection electrode pattern and the slit pitch of the dummy pattern are same.

(3) The display device with a touch detection function according to (1), wherein the slits of the detection electrode pattern have a zigzag line shape in which a straight line having an angle with respect to a direction orthogonal to the extending direction of the scanning signal lines is folded back at a bent part.

(4) The display device with a touch detection function according to (1), wherein the slits of the detection electrode pattern have a wavy line shape in which a straight line having an angle with respect to a direction orthogonal to the extending direction of the scanning signal lines is folded back at a bent part.

(5) The display device with a touch detection function according to (3), wherein the slits of the detection electrode pattern has a shape in which the straight line having the angle with respect to the direction orthogonal to the extending direction of the scanning signal lines extends across one or more of the pixel electrodes, as viewed in the vertical direction.

(6) The display device with a touch detection function according to (3), further comprising a plurality of pixel signal lines that extend on a plane parallel to the surface of the substrate to supply a pixel signal for displaying an image to the pixel electrodes, wherein
the bent part overlaps a part of the pixel signal line as viewed in the vertical direction.

(7) The display device with a touch detection function according to (3), further comprising a plurality of pixel signal lines that extend on a plane parallel to the surface of the substrate to supply a pixel signal for displaying an image on the pixel electrodes, wherein
the slit of the detection electrode pattern extends along at least a part of the pixel signal line and overlaps therewith as viewed in the vertical direction.

(8) The display device with a touch detection function according to (3), wherein the bent part overlaps a part of the scanning signal line as viewed in the vertical direction.

(9) The display device with a touch detection function according to (1), further comprising a color filter that faces the display functional layer in the vertical direction and has a plurality of color regions colored in different colors, wherein
the slits are arranged so as to avoid a color region colored in white.

(10) The display device with a touch detection function according to (3), further comprising a light shielding layer that shields an edge of the pixel electrode from light, wherein
the slit overlaps a part of the light shielding layer as viewed in the vertical direction.

(11) The display device with a touch detection function according to (3), wherein the detection electrode pattern has a part in which boundary lines on both sides thereof in the extending direction of the scanning signal lines are parallel to each other.

(12) An electronic apparatus comprising a display device with a touch detection function that detects an external proximity object, the display device with a touch detection function comprising:
a substrate;
a plurality of pixel electrodes arranged in a matrix on a plane parallel to a surface of the substrate;
a plurality of scanning signal lines extending on a plane parallel to the surface of the substrate to supply a scanning signal for driving the pixel electrodes;
a display functional layer that provides an image display function based on an image signal;
a drive electrode that faces the pixel electrodes in a vertical direction to the surface of the substrate and extends in a direction parallel to an extending direction of the scanning signal lines; and
a plurality of touch detection electrodes including a detection electrode pattern of a transparent conductive body that faces the drive electrode in the vertical direction and extends in a direction different from the extending direction of the scanning signal lines, wherein
the detection electrode pattern includes one or more slits each of which is a region where the transparent conductive body is not present,
the slits of the detection electrode pattern of the touch detection electrodes extend in a direction different from the extending direction of the scanning signal lines with a slit pitch having a predetermined interval therebetween in the extending direction of the scanning signal lines, and
the slit pitch is multiples of a natural number of a predetermined pixel pitch in which the pixel electrodes are arranged.

The electronic apparatus according to the present disclosure includes a display device with a touch detection function. The electronic apparatus includes, but are not limited to, to television sets, digital cameras, personal computer, video cameras, portable electronic apparatuses such as mobile phones, etc.

In the display device with a touch detection function and the electronic apparatus according to the present disclosure, the possibility of causing a difference in optical wavelengths according to the presence or nonpresence of a transparent conductive body is suppressed. With this configuration, the display device with a touch detection function can suppress the possibility of shifting a color to be displayed originally.

According to one embodiment of the display device with a touch detection function and the electronic apparatus according to the present disclosure, it is possible to decrease the possibility in which Moire fringes become visible according to the visual field angle.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. A display device with a touch detection function comprising:
a substrate;
a plurality of pixel electrodes arranged in a matrix on a plane parallel to a surface of the substrate;
a plurality of scanning signal lines extending on a plane parallel to the surface of the substrate to supply a scanning signal for driving the pixel electrodes;
a display functional layer that provides an image display function based on an image signal;
a common electrode that faces the pixel electrodes in a vertical direction to the surface of the substrate;
a plurality of pixel signal lines that extend on a plane parallel to the surface of the substrate to supply a pixel signal for displaying an image to the pixel electrodes; and
a plurality of touch detection electrodes including a detection electrode pattern of a transparent conductive body that faces the substrate in the vertical direction and extends along the pixel signal lines based on an overall shape of the detection electrode pattern,
wherein
the detection electrode pattern includes a plurality of slits each of which is a region where the transparent conductive body is not present,
each of the slits has a zigzag line shape in which a straight line having an angle with respect to a first direction along the pixel signal lines is folded back at a bent part,
each of the slits has at least three consecutive bent parts,
the slits are disposed with a slit pitch having a constant interval, the slit pitch being a distance between the adjacent slits, and
the slits, each having the zigzag line shape of which an overall shape extends along the pixel signal lines, are adjacent to each other in a second direction crossing the pixel signal lines and are disposed parallel to each other maintaining the slit pitch.

2. The display device with a touch detection function according to claim 1, wherein
the touch detection electrode includes the detection electrode pattern and a dummy pattern that does not function as an electrode,
the dummy pattern includes a plurality of slits each of which is a region where the transparent conductive body is not present,
the slits of the dummy pattern of the touch detection electrodes are disposed with a slit pitch having a constant interval, the slit pitch being a distance between the adjacent slits of which an overall shape extends along the pixel signal lines, and
the slit pitch of the detection electrode pattern and the slit pitch of the dummy pattern are same.

3. The display device with a touch detection function according to claim 1, wherein each of the slits having the zigzag line shape extends across the pixel electrodes as viewed in the vertical direction.

4. The display device with a touch detection function according to claim 1, wherein
the bent part overlaps a part of the pixel signal line as viewed in the vertical direction.

5. The display device with a touch detection function according to claim 1, wherein
the slit of the detection electrode pattern extends along at least a part of the pixel signal line and overlaps therewith as viewed in the vertical direction.

6. The display device with a touch detection function according to claim 1, further comprising a light shielding layer that shields an edge of the pixel electrode from light, wherein
the slit overlaps a part of the light shielding layer as viewed in the vertical direction.

7. The display device with a touch detection function according to claim 1, wherein the detection electrode pattern has a part in which boundary lines on both sides thereof are parallel to each other.

8. The display device with a touch detection function according to claim 1, further comprising a plurality of pixels in a matrix, the pixels each including one of the pixel electrodes,
wherein each of the touch detection electrodes continuously extends to overlap at least four of the pixels in the first direction along the pixel signal lines.

9. The display device with a touch detection function according to claim 1, further comprising a plurality of pixels in a matrix, the pixels each including one of the pixel electrodes,
a bent part pitch is a distance in the second direction between the bent parts of one of the slits, the bent parts being adjacent to each other in the first direction along the pixel signal lines, and
the bent part pitch is a same as a length of the two of the pixels in the second direction.

10. A display device with a touch detection function comprising:
a substrate;
a plurality of pixel electrodes arranged in a matrix on a plane parallel to a surface of the substrate,
a plurality of scanning signal lines extending on a plane parallel to the surface of the substrate to supply a scanning signal for driving the pixel electrodes;
a display functional layer that provides an image display function based on an image signal;
a common electrode that faces the pixel electrodes in a vertical direction to the surface of the substrate;
a plurality of pixel signal lines that extend on a plane parallel to the surface of the substrate to supply a pixel signal for displaying an image to the pixel electrodes; and
a plurality of touch detection electrodes including a detection electrode pattern of a transparent conductive body that faces the substrate in the vertical direction and extends along the pixel signal lines based on an overall shape of the detection electrode pattern,
wherein
the detection electrode pattern includes a plurality of slits each of which is a region where the transparent conductive body is not present,
each of the slits of the detection electrode pattern of the touch detection electrodes has a zigzag line shape in which a straight line having an angle with respect to a first direction along the pixel signal lines is folded back at a bent part,
the slits are disposed with a slit pitch having a predetermined interval, the slit pitch being a distance between the adjacent slits of which an overall shape extends along the pixel signal lines,
each of the slits has a plurality of bent parts including at least a first bent part, a second bent part, a third bent part, a fourth bent part, a fifth bent part, and a sixth bent part consecutively in that order arranged along the pixel signal lines,
as viewed in the vertical direction, each of the first bent part and the sixth bent part overlaps a part of a corresponding scanning signal line, and none of the second to fifth bent parts overlaps any of the scanning signal lines, and
as viewed in the vertical direction, the bent parts of one of the slits, the bent parts being adjacent to each other in the first direction along the pixel signal lines, overlap different pixel signal lines.

11. The display device with a touch detection function according to claim 10, wherein all of the slits of the detection electrode pattern are disposed parallel to each other.

12. The display device with a touch detection function according to claim 10, further comprising a plurality of pixels in a matrix, the pixels each including one of the pixel electrodes,
wherein each of the touch detection electrodes continuously extends to overlap at least four of the pixels in the first direction along the pixel signal lines.

13. The display device with a touch detection function according to claim 10, further comprising a plurality of pixels in a matrix, the pixels each including one of the pixel electrodes,
a bent part pitch is a distance in a second direction crossing the pixel signal lines, between the bent parts of one of the slits, the bent parts being adjacent to each other in the first direction along the pixel signal lines, and
the bent part pitch is a same as a length of the two of the pixels in the second direction.

14. A display device with a touch detection function comprising:
a substrate;
a plurality of pixel electrodes arranged in a matrix on a plane parallel to a surface of the substrate;

a plurality of scanning signal lines extending on a plane parallel to the surface of the substrate to supply a scanning signal for driving the pixel electrodes;

a display functional layer that provides an image display function based on an image signal;

a common electrode that faces the pixel electrodes in a vertical direction to the surface of the substrate;

a plurality of pixel signal lines that extend on a plane parallel to the surface of the substrate to supply a pixel signal for displaying an image to the pixel electrodes; and a plurality of touch detection electrodes including a detection electrode pattern of a transparent conductive body that faces the substrate in the vertical direction and extends along the pixel signal lines based on an overall shape of the detection electrode pattern, wherein the detection electrode pattern includes a plurality of slits each of which is a region where the transparent conductive body is not present, each of the slits has a zigzag line shape in which a straight line having an angle with respect to a first direction along the pixel signal lines is folded back at a bent part, the slits are disposed with a slit pitch having a constant interval, the slit pitch being a distance between the adjacent slits, the bent parts of the slits are disposed with the slit pitch that is constant, and the slits, each having the zigzag shape of which an overall shape extends along the pixel signal lines, are adjacent to each other in a second direction crossing the pixel signal lines and are parallel to each other.

15. The display device with a touch detection function according to claim 14, further comprising a plurality of pixels in a matrix, the pixels each including one of the pixel electrodes, wherein each of the touch detection electrodes continuously extends to overlap at least four of the pixels in the first direction along the pixel signal lines.

16. The display device with a touch detection function according to claim 14, further comprising a plurality of pixels in a matrix, the pixels each including one of the pixel electrodes, a bent part pitch is a distance in the second direction between the bent parts of one of the slits, the bent parts being adjacent to each other in the first direction along the pixel signal lines, and the bent part pitch is a same as a length of the two of the pixels in the second direction.

17. A display device with a touch detection function comprising:

a substrate;

a plurality of pixel electrodes arranged in a matrix on a plane parallel to a surface of the substrate;

a plurality of scanning signal lines extending on a plane parallel to the surface of the substrate to supply a scanning signal for driving the pixel electrodes;

a display functional layer that provides an image display function based on an image signal;

a common electrode that faces the pixel electrodes in a vertical direction to the surface of the substrate;

a plurality of pixel signal lines that extend on a plane parallel to the surface of the substrate to supply a pixel signal for displaying an image to the pixel electrodes; and a plurality of touch detection electrodes including a detection electrode pattern of a transparent conductive body that faces the substrate in the vertical direction and extends along the pixel signal lines based on overall shape of the detection electrode pattern, wherein the detection electrode pattern includes a plurality of slits each of which is a region where the transparent conductive body is not present, each of the slits of the detection electrode pattern of the touch detection electrodes has a zigzag line shape in which a straight line having an angle with respect to a first direction along the pixel signal lines is folded back at a bent part, the slits are disposed with a slit pitch having a predetermined interval, the slit pitch being a distance between the adjacent slits of which an overall shape extends along the pixel signal lines, and the slits adjacent to each other, each of which has a plurality of bent parts including at least three consecutive bent parts each overlapping a part of a corresponding scanning signal line as viewed in the vertical direction, are disposed parallel to each other maintaining the slit pitch, and as viewed in the vertical direction, the bend parts of one of the slits, the bend parts being adjacent to each other in the first direction along the pixel signal lines, overlap different pixel signal lines.

18. The display device with a touch detection function according to claim 17, further comprising a plurality of pixels in a matrix, the pixels each including one of the pixel electrodes, wherein each of the touch detection electrodes continuously extends to overlap at least four of the pixels in the first direction along the pixel signal lines.

19. The display device with a touch detection function according to claim 17, further comprising a plurality of pixels in a matrix, the pixels each including one of the pixel electrodes, a bent part pitch is a distance in a second direction crossing the pixel signal lines, between the bent parts of one of the slits, the bent parts being adjacent to each other in the first direction along the pixel signal lines, and the bent part pitch is a same as a length of the two of the pixels in the second direction.

* * * * *